(12) United States Patent
Sugiyama et al.

(10) Patent No.: US 11,522,635 B2
(45) Date of Patent: *Dec. 6, 2022

(54) DEVICE AND METHOD FOR TRANSMITTING DATA BY USING MULTILEVEL CODING, AND COMMUNICATION SYSTEM

(71) Applicant: FUJITSU LIMITED, Kawasaki (JP)

(72) Inventors: Junichi Sugiyama, Kawasaki (JP); Toshihiro Konno, Sendai (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/369,522

(22) Filed: Jul. 7, 2021

(65) Prior Publication Data

US 2022/0038204 A1 Feb. 3, 2022

(30) Foreign Application Priority Data

Jul. 31, 2020 (JP) .............................. JP2020-129933
Apr. 26, 2021 (JP) .............................. JP2021-073749

(51) Int. Cl.
*H04L 1/00* (2006.01)
*H04B 10/54* (2013.01)
*H04L 1/16* (2006.01)

(52) U.S. Cl.
CPC ......... *H04L 1/0009* (2013.01); *H04B 10/541* (2013.01); *H04L 1/0003* (2013.01); *H04L 1/0061* (2013.01); *H04L 1/1614* (2013.01)

(58) Field of Classification Search
CPC .... H03M 13/15; H03M 13/17; H03M 13/152; H03M 13/255; H03M 13/25; H04L 1/0001; H04L 1/0003; H04L 1/0009; H04L 1/0041; H04L 1/0057; H04L 1/0071

See application file for complete search history.

(56) References Cited

U.S. PATENT DOCUMENTS

| | | | |
|---|---|---|---|
| 9,336,079 B2 | 5/2016 | Zhang et al. | |
| 2014/0105328 A1* | 4/2014 | Ko | H04L 1/0071 375/298 |
| 2015/0160997 A1 | 6/2015 | Zhang et al. | |
| 2015/0358194 A1* | 12/2015 | Yu | H04L 1/0009 370/329 |
| 2020/0366408 A1 | 11/2020 | Koganei et al. | |

FOREIGN PATENT DOCUMENTS

| | | |
|---|---|---|
| JP | 2017-507510 A | 3/2017 |
| JP | 2020-188357 A | 11/2020 |

* cited by examiner

*Primary Examiner* — Shelly A Chase
(74) *Attorney, Agent, or Firm* — ArentFox Schiff LLP

(57) ABSTRACT

A communication device includes a modulator, a first encoder and a second encoder, and generates a modulated signal with quadrature amplitude modulation. The modulator generates a modulated signal by mapping each symbol in a data frame that includes data, a first code, and a second code to a signal point among signal points of the quadrature amplitude modulation. The first encoder encodes the data by using a first coding scheme to generate the first code. The second encoder encodes, by using a second coding scheme, a bit string formed from a specified bit in a plurality of bits allocated to each symbol in the data frame to generate the second code. The modulator performs mapping such that each pair of adjacent signal points are different from each other in terms of a value of the specified bit in the plurality of bits.

13 Claims, 31 Drawing Sheets

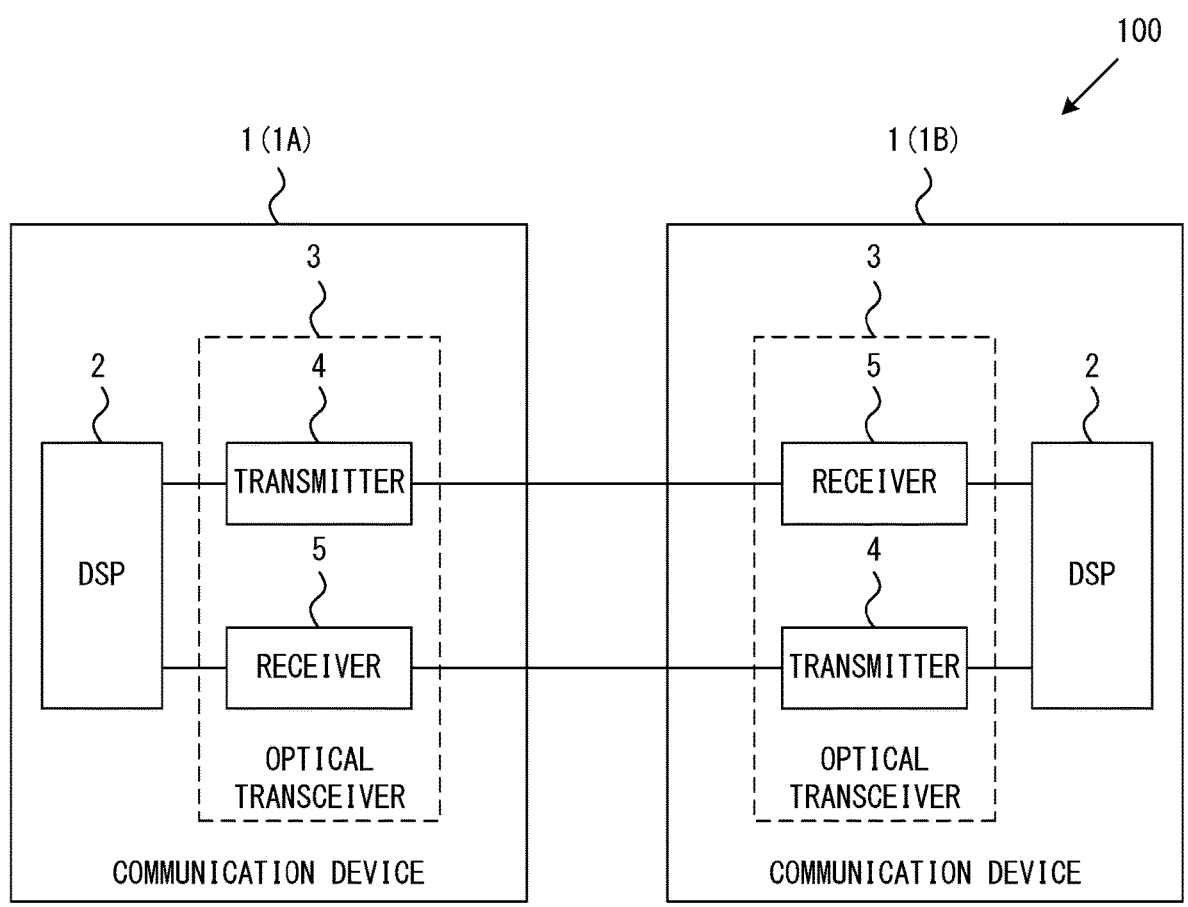
F I G. 1

FIG. 5A
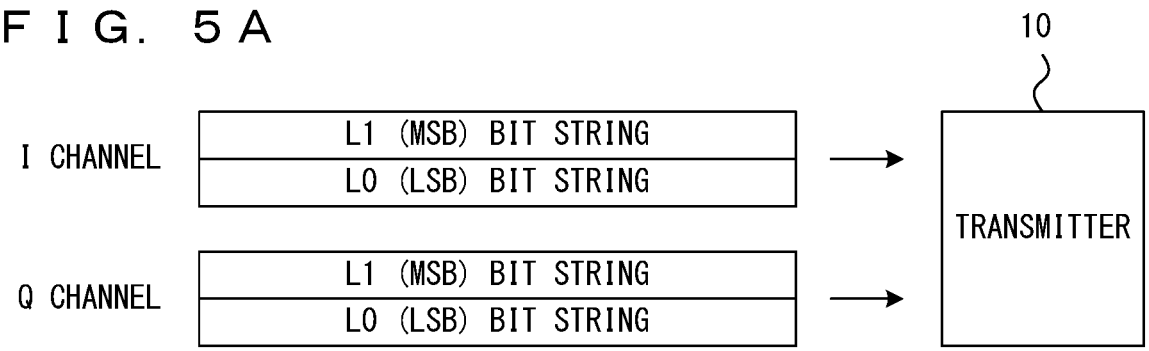
FIG. 5B
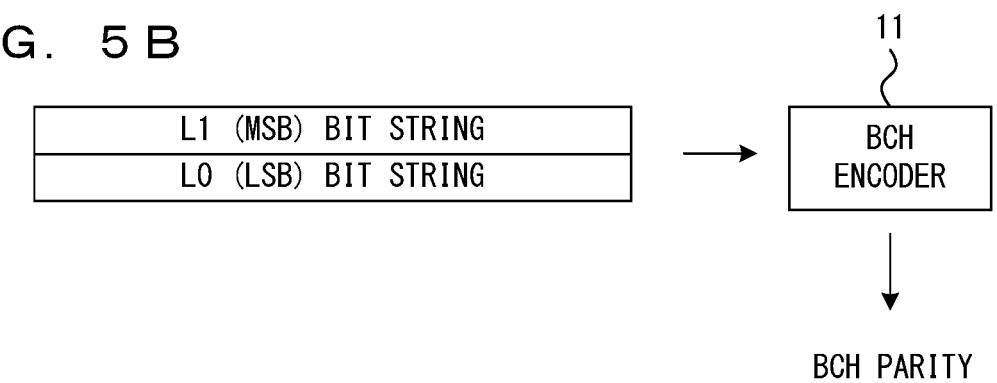
FIG. 5C
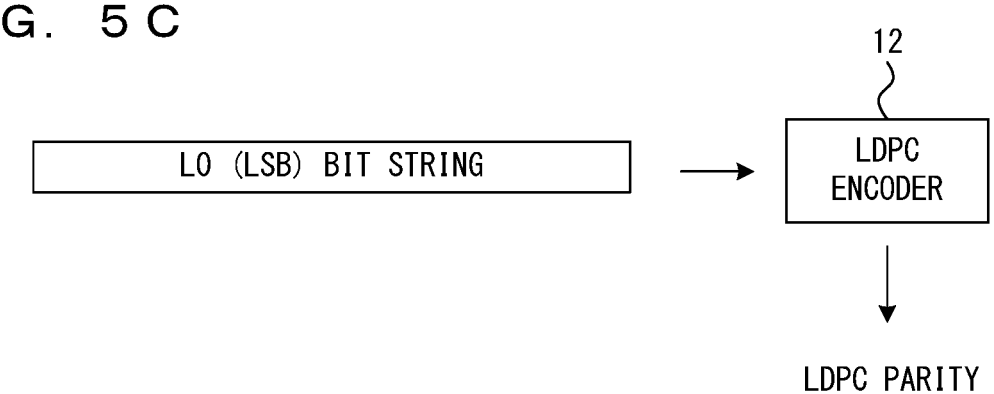
FIG. 5D
| L1 (MSB) BIT STRING | BCH PARITY |
|---|---|
| L0 (LSB) BIT STRING | LDPC PARITY |

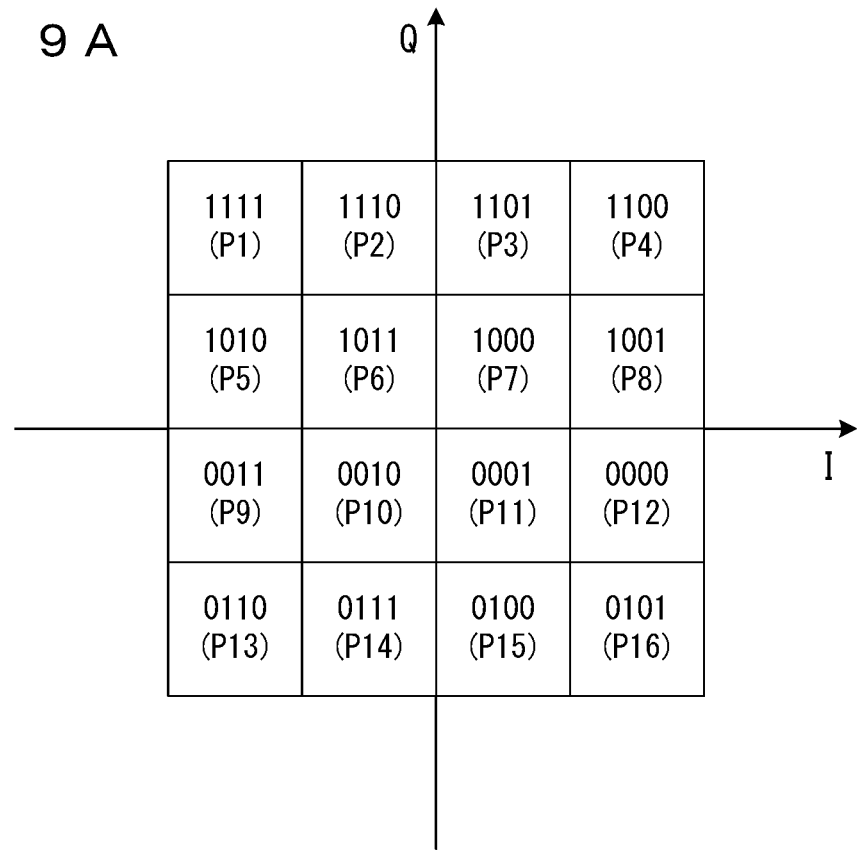

FIG. 12A
| L5 (MSB) BIT STRING | BCH PARITY |
|---|---|
| L4 BIT STRING | |
| L3 BIT STRING | |
| L2 BIT STRING | |
| L1 BIT STRING | |
| L0 (LSB) BIT STRING | LDPC PARITY |
FIG. 12B
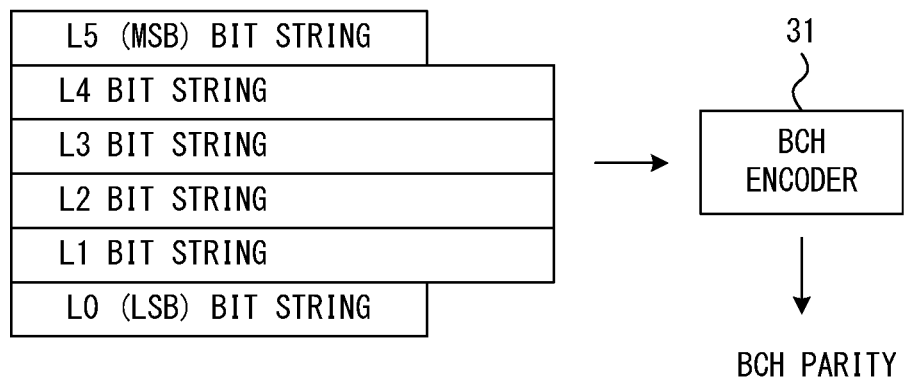
FIG. 12C
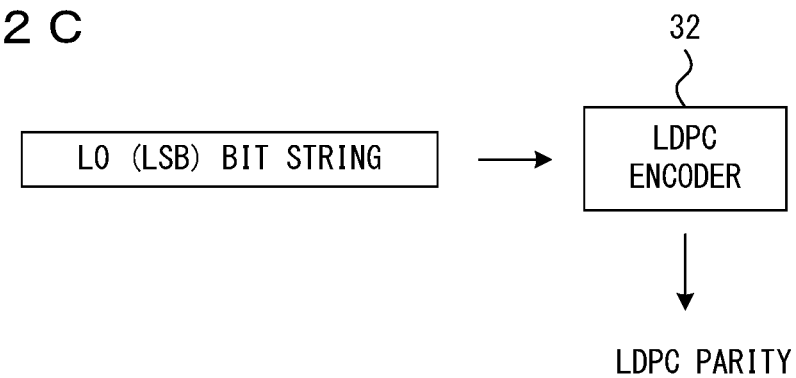

level 0 (LSB)

| 1 | 0 | 1 | 0 | 1 | 0 | 1 | 0 |
|---|---|---|---|---|---|---|---|
| 0 | 1 | 0 | 1 | 0 | 1 | 0 | 1 |
| 1 | 0 | 1 | 0 | 1 | 0 | 1 | 0 |
| 0 | 1 | 0 | 1 | 0 | 1 | 0 | 1 |
| 1 | 0 | 1 | 0 | 1 | 0 | 1 | 0 |
| 0 | 1 | 0 | 1 | 0 | 1 | 0 | 1 |
| 1 | 0 | 1 | 0 | 1 | 0 | 1 | 0 |
| 0 | 1 | 0 | 1 | 0 | 1 | 0 | 1 | level 1

| 1 | 1 | 1 | 1 | 0 | 0 | 0 | 0 |
|---|---|---|---|---|---|---|---|
| 1 | 1 | 1 | 1 | 0 | 0 | 0 | 0 |
| 1 | 1 | 1 | 1 | 0 | 0 | 0 | 0 |
| 1 | 1 | 1 | 1 | 0 | 0 | 0 | 0 |
| 1 | 1 | 1 | 1 | 0 | 0 | 0 | 0 |
| 1 | 1 | 1 | 1 | 0 | 0 | 0 | 0 |
| 1 | 1 | 1 | 1 | 0 | 0 | 0 | 0 |
| 1 | 1 | 1 | 1 | 0 | 0 | 0 | 0 | level 2

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 | level 3

| 1 | 1 | 0 | 0 | 0 | 0 | 1 | 1 |
|---|---|---|---|---|---|---|---|
| 1 | 1 | 0 | 0 | 0 | 0 | 1 | 1 |
| 1 | 1 | 0 | 0 | 0 | 0 | 1 | 1 |
| 1 | 1 | 0 | 0 | 0 | 0 | 1 | 1 |
| 1 | 1 | 0 | 0 | 0 | 0 | 1 | 1 |
| 1 | 1 | 0 | 0 | 0 | 0 | 1 | 1 |
| 1 | 1 | 0 | 0 | 0 | 0 | 1 | 1 |
| 1 | 1 | 0 | 0 | 0 | 0 | 1 | 1 | level 4

| 0 | 0 | 0 | 0 | 0 | 0 | 0 | 0 |
|---|---|---|---|---|---|---|---|
| 0 | 0 | 0 | 0 | 0 | 0 | 0 | 0 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 0 | 0 | 0 | 0 | 0 | 0 | 0 | 0 |
| 0 | 0 | 0 | 0 | 0 | 0 | 0 | 0 | level 5 (MSB)

| 0 | 1 | 1 | 0 | 0 | 1 | 1 | 0 |
|---|---|---|---|---|---|---|---|
| 0 | 1 | 1 | 0 | 0 | 1 | 1 | 0 |
| 0 | 1 | 1 | 0 | 0 | 1 | 1 | 0 |
| 0 | 1 | 1 | 0 | 0 | 1 | 1 | 0 |
| 0 | 1 | 1 | 0 | 0 | 1 | 1 | 0 |
| 0 | 1 | 1 | 0 | 0 | 1 | 1 | 0 |
| 0 | 1 | 1 | 0 | 0 | 1 | 1 | 0 |
| 0 | 1 | 1 | 0 | 0 | 1 | 1 | 0 |

FIG. 14

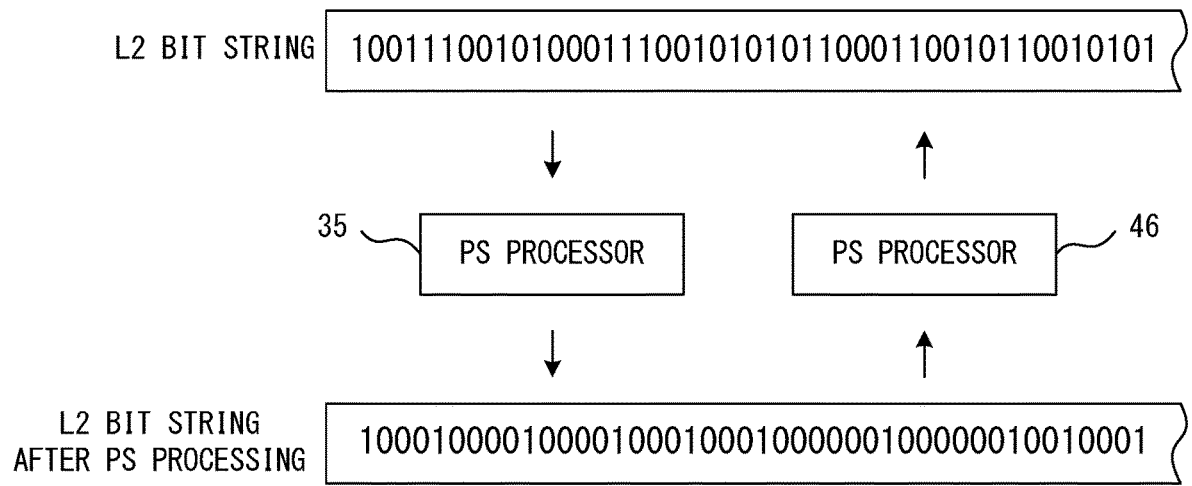
F I G. 1 7 level 0 (LSB)

| 1 | 0 | 1 | 0 | 1 | 0 | 1 | 0 |
|---|---|---|---|---|---|---|---|
| 0 | 1 | 0 | 1 | 0 | 1 | 0 | 1 |
| 1 | 0 | 1 | 0 | 1 | 0 | 1 | 0 |
| 0 | 1 | 0 | 1 | 0 | 1 | 0 | 1 |
| 1 | 0 | 1 | 0 | 1 | 0 | 1 | 0 |
| 0 | 1 | 0 | 1 | 0 | 1 | 0 | 1 |
| 1 | 0 | 1 | 0 | 1 | 0 | 1 | 0 |
| 0 | 1 | 0 | 1 | 0 | 1 | 0 | 1 | level 3

| 1 | 1 | 0 | 0 | 0 | 0 | 1 | 1 |
|---|---|---|---|---|---|---|---|
| 1 | 1 | 0 | 0 | 0 | 0 | 1 | 1 |
| 1 | 1 | 0 | 0 | 0 | 0 | 1 | 1 |
| 1 | 1 | 0 | 0 | 0 | 0 | 1 | 1 |
| 1 | 1 | 0 | 0 | 0 | 0 | 1 | 1 |
| 1 | 1 | 0 | 0 | 0 | 0 | 1 | 1 |
| 1 | 1 | 0 | 0 | 0 | 0 | 1 | 1 |
| 1 | 1 | 0 | 0 | 0 | 0 | 1 | 1 | level 1

| 1 | 1 | 1 | 1 | 0 | 0 | 0 | 0 |
|---|---|---|---|---|---|---|---|
| 1 | 1 | 1 | 1 | 0 | 0 | 0 | 0 |
| 1 | 1 | 1 | 1 | 0 | 0 | 0 | 0 |
| 1 | 1 | 1 | 1 | 0 | 0 | 0 | 0 |
| 1 | 1 | 1 | 1 | 0 | 0 | 0 | 0 |
| 1 | 1 | 1 | 1 | 0 | 0 | 0 | 0 |
| 1 | 1 | 1 | 1 | 0 | 0 | 0 | 0 |
| 1 | 1 | 1 | 1 | 0 | 0 | 0 | 0 | level 4

| 1 | 1 | 1 | 1 | 1 | 1 | 1 | 1 |
|---|---|---|---|---|---|---|---|
| 1 | 1 | 1 | 1 | 1 | 1 | 1 | 1 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 1 | 1 | 1 | 1 | 1 | 1 | 1 | 1 |
| 1 | 1 | 1 | 1 | 1 | 1 | 1 | 1 | level 2

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 | level 5 (MSB)

| 0 | 1 | 1 | 0 | 0 | 1 | 1 | 0 |
|---|---|---|---|---|---|---|---|
| 0 | 1 | 1 | 0 | 0 | 1 | 1 | 0 |
| 0 | 1 | 1 | 0 | 0 | 1 | 1 | 0 |
| 0 | 1 | 1 | 0 | 0 | 1 | 1 | 0 |
| 0 | 1 | 1 | 0 | 0 | 1 | 1 | 0 |
| 0 | 1 | 1 | 0 | 0 | 1 | 1 | 0 |
| 0 | 1 | 1 | 0 | 0 | 1 | 1 | 0 |
| 0 | 1 | 1 | 0 | 0 | 1 | 1 | 0 |

F I G. 2 5 level 0 (LSB)

| 1 | 0 | 1 | 0 | 1 | 0 | 1 | 0 |
|---|---|---|---|---|---|---|---|
| 0 | 1 | 0 | 1 | 0 | 1 | 0 | 1 |
| 1 | 0 | 1 | 0 | 1 | 0 | 1 | 0 |
| 0 | 1 | 0 | 1 | 0 | 1 | 0 | 1 |
| 1 | 0 | 1 | 0 | 1 | 0 | 1 | 0 |
| 0 | 1 | 0 | 1 | 0 | 1 | 0 | 1 |
| 1 | 0 | 1 | 0 | 1 | 0 | 1 | 0 |
| 0 | 1 | 0 | 1 | 0 | 1 | 0 | 1 | level 1

| 1 | 1 | 1 | 1 | 0 | 0 | 0 | 0 |
|---|---|---|---|---|---|---|---|
| 1 | 1 | 1 | 1 | 0 | 0 | 0 | 0 |
| 1 | 1 | 1 | 1 | 0 | 0 | 0 | 0 |
| 1 | 1 | 1 | 1 | 0 | 0 | 0 | 0 |
| 1 | 1 | 1 | 1 | 0 | 0 | 0 | 0 |
| 1 | 1 | 1 | 1 | 0 | 0 | 0 | 0 |
| 1 | 1 | 1 | 1 | 0 | 0 | 0 | 0 |
| 1 | 1 | 1 | 1 | 0 | 0 | 0 | 0 | level 2

| 1 | 0 | 1 | 0 | 0 | 1 | 0 | 1 |
|---|---|---|---|---|---|---|---|
| 1 | 0 | 1 | 0 | 0 | 1 | 0 | 1 |
| 1 | 0 | 1 | 0 | 0 | 1 | 0 | 1 |
| 1 | 0 | 1 | 0 | 0 | 1 | 0 | 1 |
| 1 | 0 | 1 | 0 | 0 | 1 | 0 | 1 |
| 1 | 0 | 1 | 0 | 0 | 1 | 0 | 1 |
| 1 | 0 | 1 | 0 | 0 | 1 | 0 | 1 |
| 1 | 0 | 1 | 0 | 0 | 1 | 0 | 1 | level 3

| 1 | 1 | 0 | 0 | 0 | 0 | 1 | 1 |
|---|---|---|---|---|---|---|---|
| 1 | 1 | 0 | 0 | 0 | 0 | 1 | 1 |
| 1 | 1 | 0 | 0 | 0 | 0 | 1 | 1 |
| 1 | 1 | 0 | 0 | 0 | 0 | 1 | 1 |
| 1 | 1 | 0 | 0 | 0 | 0 | 1 | 1 |
| 1 | 1 | 0 | 0 | 0 | 0 | 1 | 1 |
| 1 | 1 | 0 | 0 | 0 | 0 | 1 | 1 |
| 1 | 1 | 0 | 0 | 0 | 0 | 1 | 1 | level 4

| 1 | 1 | 1 | 1 | 1 | 1 | 1 | 1 |
|---|---|---|---|---|---|---|---|
| 1 | 1 | 1 | 1 | 1 | 1 | 1 | 1 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 1 | 1 | 1 | 1 | 1 | 1 | 1 | 1 |
| 1 | 1 | 1 | 1 | 1 | 1 | 1 | 1 | level 5 (MSB)

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |

F I G. 2 6 level 0 (LSB)

| 1 | 0 | 1 | 0 | 1 | 0 | 1 | 0 |
|---|---|---|---|---|---|---|---|
| 0 | 1 | 0 | 1 | 0 | 1 | 0 | 1 |
| 1 | 0 | 1 | 0 | 1 | 0 | 1 | 0 |
| 0 | 1 | 0 | 1 | 0 | 1 | 0 | 1 |
| 1 | 0 | 1 | 0 | 1 | 0 | 1 | 0 |
| 0 | 1 | 0 | 1 | 0 | 1 | 0 | 1 |
| 1 | 0 | 1 | 0 | 1 | 0 | 1 | 0 |
| 0 | 1 | 0 | 1 | 0 | 1 | 0 | 1 | level 1

| 1 | 1 | 1 | 1 | 1 | 1 | 1 | 1 |
|---|---|---|---|---|---|---|---|
| 0 | 0 | 0 | 0 | 0 | 0 | 0 | 0 |
| 1 | 1 | 1 | 1 | 1 | 1 | 1 | 1 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 1 | 1 | 1 | 1 | 1 | 1 | 1 | 1 |
| 0 | 0 | 0 | 0 | 0 | 0 | 0 | 0 |
| 1 | 1 | 1 | 1 | 1 | 1 | 1 | 1 | level 2

| 1 | 0 | 1 | 0 | 0 | 1 | 0 | 1 |
|---|---|---|---|---|---|---|---|
| 1 | 0 | 1 | 0 | 0 | 1 | 0 | 1 |
| 1 | 0 | 1 | 0 | 0 | 1 | 0 | 1 |
| 1 | 0 | 1 | 0 | 0 | 1 | 0 | 1 |
| 1 | 0 | 1 | 0 | 0 | 1 | 0 | 1 |
| 1 | 0 | 1 | 0 | 0 | 1 | 0 | 1 |
| 1 | 0 | 1 | 0 | 0 | 1 | 0 | 1 |
| 1 | 0 | 1 | 0 | 0 | 1 | 0 | 1 | level 3

| 1 | 1 | 0 | 0 | 0 | 0 | 1 | 1 |
|---|---|---|---|---|---|---|---|
| 1 | 1 | 0 | 0 | 0 | 0 | 1 | 1 |
| 1 | 1 | 0 | 0 | 0 | 0 | 1 | 1 |
| 1 | 1 | 0 | 0 | 0 | 0 | 1 | 1 |
| 1 | 1 | 0 | 0 | 0 | 0 | 1 | 1 |
| 1 | 1 | 0 | 0 | 0 | 0 | 1 | 1 |
| 1 | 1 | 0 | 0 | 0 | 0 | 1 | 1 |
| 1 | 1 | 0 | 0 | 0 | 0 | 1 | 1 | level 4

| 1 | 1 | 1 | 1 | 1 | 1 | 1 | 1 |
|---|---|---|---|---|---|---|---|
| 1 | 1 | 1 | 1 | 1 | 1 | 1 | 1 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 1 | 1 | 1 | 1 | 1 | 1 | 1 | 1 |
| 1 | 1 | 1 | 1 | 1 | 1 | 1 | 1 | level 5 (MSB)

| 1 | 1 | 1 | 1 | 0 | 0 | 0 | 0 |
|---|---|---|---|---|---|---|---|
| 1 | 1 | 1 | 1 | 0 | 0 | 0 | 0 |
| 1 | 1 | 1 | 1 | 0 | 0 | 0 | 0 |
| 1 | 1 | 1 | 1 | 0 | 0 | 0 | 0 |
| 1 | 1 | 1 | 1 | 0 | 0 | 0 | 0 |
| 1 | 1 | 1 | 1 | 0 | 0 | 0 | 0 |
| 1 | 1 | 1 | 1 | 0 | 0 | 0 | 0 |
| 1 | 1 | 1 | 1 | 0 | 0 | 0 | 0 |

FIG. 27

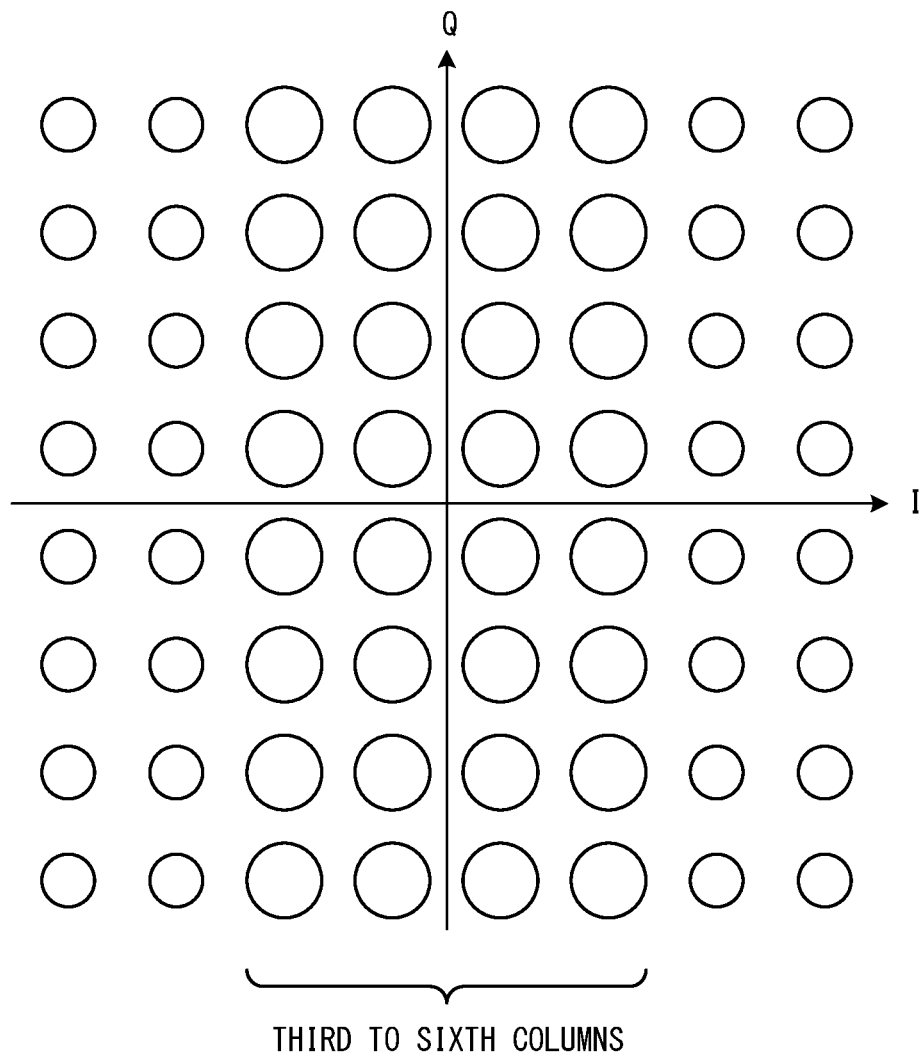
F I G. 2 8

PS PROCESSING FOR L2-L4 INDICATED IN FIG. 26

DEVICE AND METHOD FOR TRANSMITTING DATA BY USING MULTILEVEL CODING, AND COMMUNICATION SYSTEM

CROSS-REFERENCE TO RELATED APPLICATIONS

This application is based upon and claims the benefit of priority of the prior Japanese Patent Applications No. 2020-129933, filed on Jul. 31, 2020 and No. 2021-073749, filed on Apr. 26, 2021, the entire contents of which are incorporated herein by reference.

FIELD

The embodiments discussed herein are related to a communication device and a communication method for transmitting data by using multilevel coding, and a communication system.

BACKGROUND

Error corrections for correcting errors in data in communication systems have been widespread. An error correction is implemented by adding an error correction code to the end of a transmission frame. In particular, a transmission device on the transmission side adds an error correction code to the end of a transmission frame including data. A communication device on the reception side detects whether there is an error in received data by using an error correction code. When an error is detected, the error correction code is used to correct the error.

In the meantime, the number of bits allocated to each symbol has been increasing to allow communication systems to have a larger capacity. However, when many bits are allocated to each symbol, there will be many signal points at which the symbols could be located, and the distances between the signal points will be short. Hence, an error will easily occur. For example, an error could easily occur at the least significant bit (i.e., LSB) of a plurality of bits allocated to each symbol.

Accordingly, multilevel coding may be performed in a communication system in which many bits are allocated to each symbol. As a general rule, a plurality of coding schemes with different correction capabilities are used in multilevel coding. Both data reliability and bandwidth use efficiency are improved using multilevel coding.

In proposed methods, a plurality of bits are encoded using first and second parity bits (e.g., Japanese National Publication of International Patent Application No. 2017-507510).

As indicated above, multilevel coding has attracted attention as one method for improving both data reliability and bandwidth use efficiency. However, the conventional multilevel coding may involve large power consumption.

For example, when 16 quadrature amplitude modulation (16QAM) is used, four bits may be allocated to each symbol. Two bits are allocated to I channel, and the remaining two bits are allocated to Q channel. In this case, LSBs are encoded for the I channel by using a coding scheme with a high correction capability and also encoded for the Q channel by using a coding scheme with a high correction capability.

However, coding schemes with a high correction capability typically involve large power consumption. Especially when a decoding device recovers data by performing iterative processing using soft decision information, the iterative processing will consume a large amount of power. According to the prior art, such iterative processing is performed for both I channel and Q channel. Hence, the conventional multilevel coding may involve large power consumption.

SUMMARY

According to an aspect of the embodiments, a communication device generates a modulated signal with quadrature amplitude modulation that allocates a plurality of bits to each symbol. The communication device includes: a modulator configured to generate a modulated signal by mapping each symbol in a data frame that includes transmission data, a first code, and a second code to a signal point among two-dimensionally arranged signal points specific to the quadrature amplitude modulation; a first encoder configured to encode the transmission data by using a first coding scheme so as to generate the first code; and a second encoder configured to encode, by using a second coding scheme different from the first coding scheme, a bit string formed from a specified bit in a plurality of bits allocated to each symbol in the data frame so as to generate the second code. The modulator performs mapping such that each pair of adjacent signal points are different from each other in terms of a value of the specified bit in the plurality of bits.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of a communication system in accordance with embodiments of the invention;

FIGS. 5A-5D illustrate an example of coding in a communication system that includes a transmitter and a receiver depicted in FIG. 3;

FIGS. 9A and 9B illustrate an example of a mapping rule for 16QAM;

FIGS. 12A-12C illustrate an example of coding for 64QAM;

FIG. 14 illustrates a mapping rule depicted in FIG. 13 separately for each bit;

FIG. 17 illustrates an example of PS processing;

FIGS. 25-27 illustrate examples of mapping rules for 64QAM in a second embodiment;

FIG. 28 illustrates the probabilities of use of 64QAM signal points that are attained when PS processing is performed for one bit string;

DESCRIPTION OF EMBODIMENTS

Figure 2:
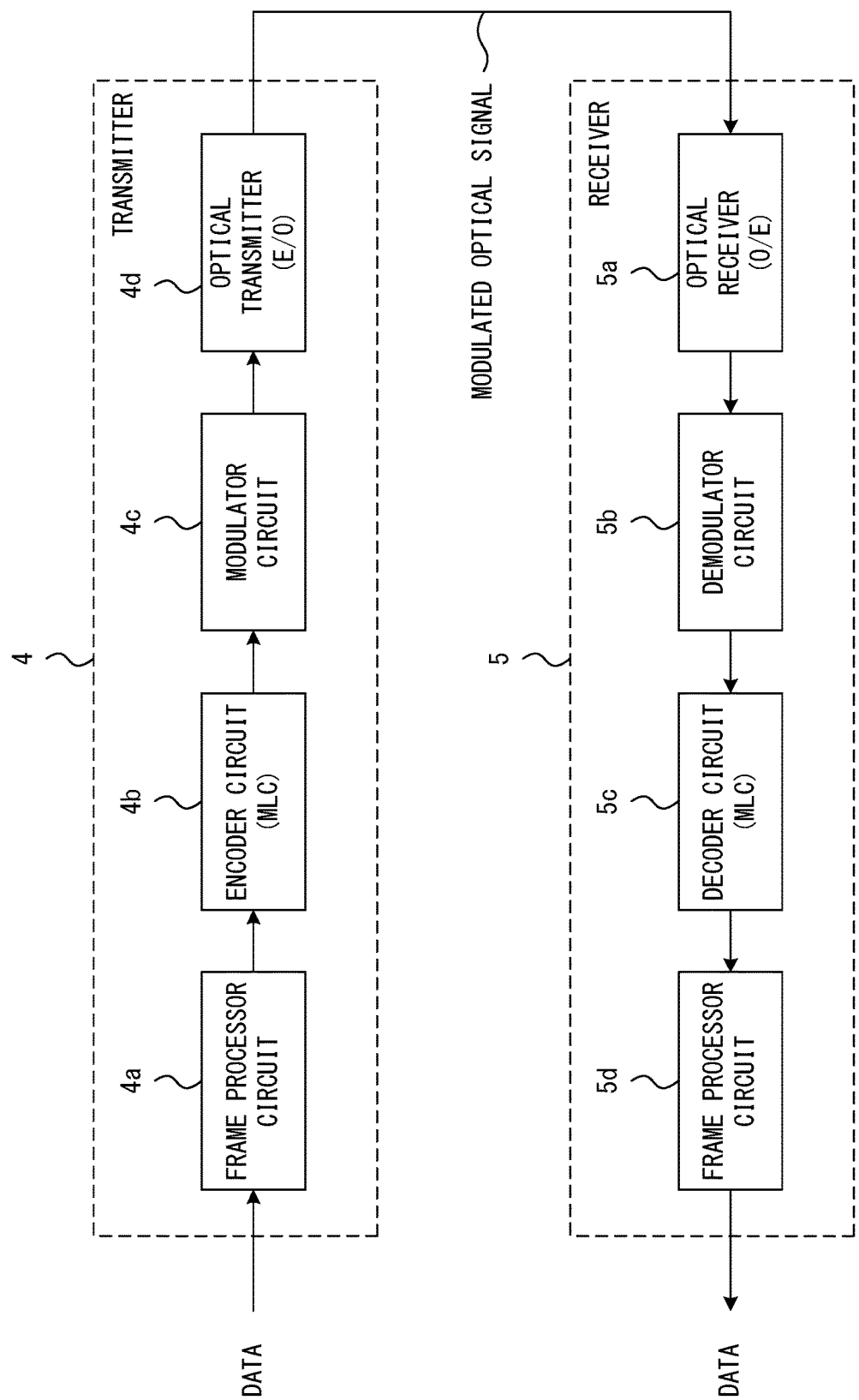
FIG. 2 illustrates a configuration example of a communication system.

FIG. 1 illustrates an example of a communication system in accordance with embodiments of the invention. The communication system 100 includes a plurality of communication devices 1 (1A, 1B).

The communication device 1 includes a digital signal processor (DSP) 2 and an optical transceiver 3. The DSP 2 generates data to be transmitted to another communication device. The DSP 2 processes data received by the communication device 1 from another communication device. The optical transceiver 3 includes a transmitter 4 and a receiver 5. The transmitter 4 transmits data generated by the DSP 2 to another communication device. The transmitter 4 includes an encoder for encoding transmission data. The receiver 5 receives data transmitted from another communication device. The receiver 5 includes a decoder for decoding received data.

The communication system 100 transmits an optical signal with quadrature amplitude modulation. In quadrature amplitude modulation, a plurality of bits are allocated to each symbol. For example, four bits may be allocated to each symbol in 16QAM, and six bits may be allocated to each symbol in 64QAM. Note that QAM may be referred to as quadrature phase amplitude modulation.

In the communication system 100, transmission data is encoded using multilevel codes. A plurality of codes with different error correction capabilities are used in multilevel coding. In this example, Bose-Chaudhuri-Hocquenghem (BCH) codes and low-density parity-check (LDPC) codes are used. BCH code typically has a moderately high error correction capability but involves low power consumption.

An LDPC code typically has a high error correction capability and is thus effective for a path with large noise but tends to cause a decoder circuit to consume high power. The following descriptions are based on the assumption that LDPC codes have a higher error correction capability than BCH codes.

FIG. 2 illustrates a configuration example of the communication system 100. The transmitter 4 and the receiver 5 depicted in FIG. 2 may be implemented in each of the communication devices 1A and 1B in the communication system 100 depicted in FIG. 1.

The transmitter 4 includes a frame processor circuit 4a, an encoder circuit 4b, a modulator circuit 4c, and an optical transmitter 4d. The frame processor circuit 4a stores data generated by an application in a specified frame. For example, the specified frame may be, but is not particularly limited to, an optical transport network (OTN) frame. The encoder circuit 4b encodes a bit string stored in a frame. In this case, the encoder circuit 4b performs multilevel coding. The modulator circuit 4c maps, for each symbol, a bit string encoded by the encoder circuit 4b to a corresponding signal point among two-dimensionally arranged signal points. The modulator circuit 4c may have an equalizer (e.g., pre-equalization) function. The optical transmitter 4d generates a modulated optical signal in accordance with a signal point determined by the modulator circuit 4c.

The receiver 5 includes an optical receiver 5a, a demodulator circuit 5b, a decoder circuit 5c, and a frame processor circuit 5d. The optical receiver 5a converts a received optical signal into an electric signal. In this case, the optical receiver 5a may generate electric field information indicating the received optical signal. The demodulator circuit 5b demodulates a received signal. The demodulator circuit 5b may have an equalizer function. The decoder circuit 5c decodes the signal demodulated by the demodulator circuit 5b. In this case, the decoder circuit 5c performs a decoding process corresponding to multilevel coding performed by the encoder circuit 4b. The decoder circuit 5c performs an error correction. The frame processor circuit 5d processes a received frame.

Figure 3:
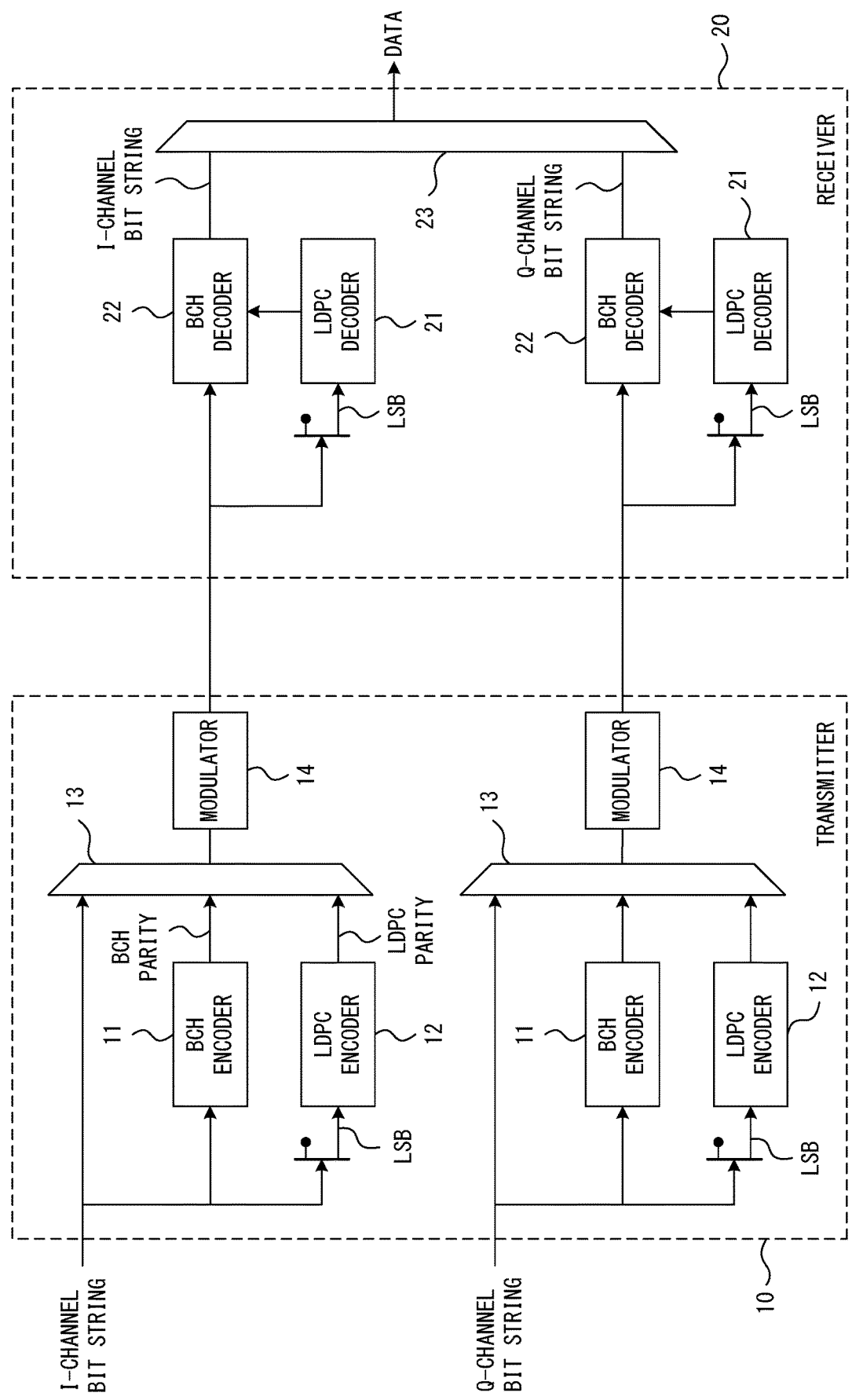
FIG. 3 illustrates an example of a transmitter and a receiver.

FIG. 3 illustrates an example of the transmitter and the receiver used in the communication system 100. The transmitter 10 and the receiver 20 depicted in FIG. 3 respectively correspond to the transmitter 4 implemented in the communication device 1A and the receiver 5 implemented in the communication device 1B in the communication system 100 depicted in FIG. 1.

Figure 4A:
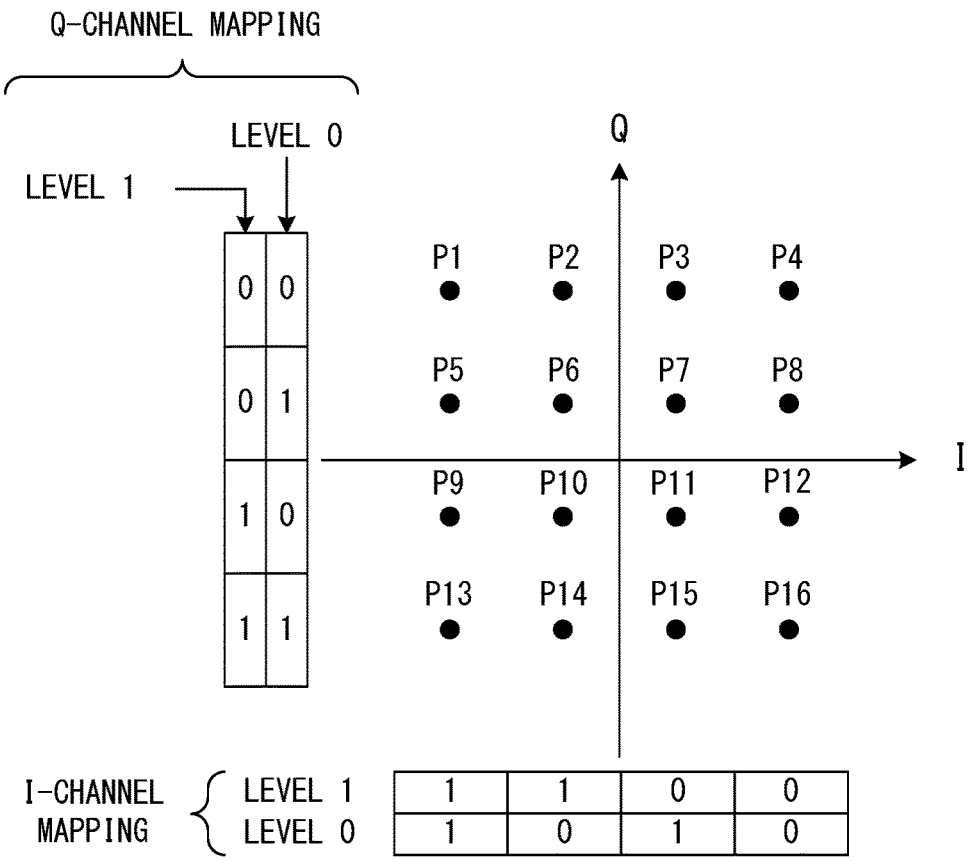
FIGS. 4A and 4B illustrate an example of mapping in a communication system depicted in FIG. 3.
Figure 4B:
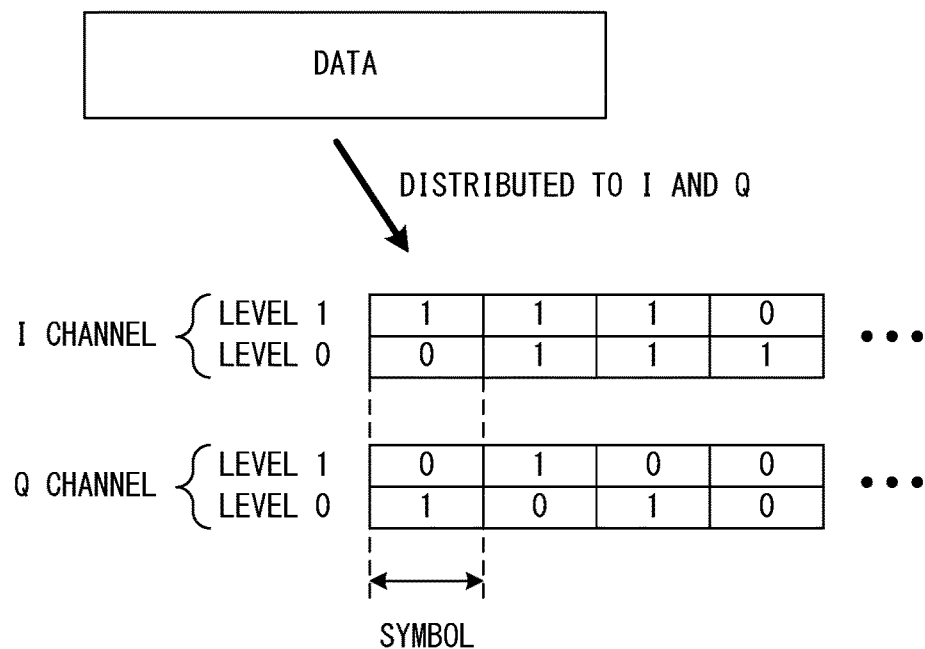

FIGS. 4A and 4B illustrate an example of mapping in the communication system depicted in FIG. 3. The transmitter 10 transmits data with quadrature amplitude modulation. In this example, the transmitter 10 transmits data with 16QAM. In 16QAM, four bits are allocated to each symbol. Thus, each symbol carries four bits. Accordingly, 16QAM uses 16 signal points P1-P16 depicted in FIG. 4A. A transmission symbols is mapped to a signal point corresponding to a 4-bit value forming the symbol. In this case, four bits of data are transmitted using a pair of channels (I and Q) orthogonal to each other. In particular, as depicted in FIG. 4B, two of four bits indicating each symbol are allocated to the I channel, and the remaining two bits are allocated to the Q channel. Data transmitted using the I channel may hereinafter be referred to as an I-channel bit string. Data transmitted using the Q channel may hereinafter be referred to as a Q-channel bit string.

Assume, for example, that four bits allocated to a transmission symbol is "1001," as depicted in FIG. 4B and that the high two bits "10" are allocated to the I channel and the low two bits "01" are allocated to the Q channel. In this case, mapping is performed for each of the I channel and the Q channel. In the example depicted in FIG. 4A, a signal point P2, P6, P10, or P14 is selected when the data of the I channel is "10." The signal point P5, P6, P7, or P8 is selected when the data of the Q channel is "01." Thus, the transmission symbol is mapped to the signal point P6 selected by both the data of the I channel and the data of the Q channel. In this case, the symbol "1001" is transmitted using a phase and an amplitude that correspond to the signal point P6.

As described above, the transmitter 10 separately processes an I-channel bit string and a Q-channel bit string. Accordingly, as depicted in FIG. 3, the transmitter 10 includes, for each of the channels, a BCH encoder 11, an LDPC encoder 12, a frame generator 13, and a modulator 14.

FIGS. 5A-5D illustrate an example of coding in the communication system that includes the transmitter 10 and the receiver 20 depicted in FIG. 3. As depicted in FIG. 5A, transmission data is separated into an I-channel bit string and a Q-channel bit string and supplied to the transmitter 10. The bit string of each channel is formed from an L0 bit string (i.e., LSB bit string) and an L1 bit string (i.e., MSB bit string).

As depicted in FIG. 5B, the BCH encoder 11 generates a BCH parity by performing BCH coding for an L0 bit string and an L1 bit string. The BCH parity is an example of a BCH code. As depicted in FIG. 5C, the LDPC encoder 12 generates an LDPC parity by performing LDPC coding for an L0 bit string. The LDPC parity is an example of an LDPC code.

The frame generator 13 generates a transmission data frame by adding a BCH parity and an LDPC parity to input bit strings. In this case, as depicted in FIG. 5D, the LDPC parity is added to an L0 bit string. The BCH parity is added to an L1 bit string. The modulator 14 maps each of the symbols in the data frame output from the frame generator 13 to a corresponding signal point. The mapping follows the rule indicated in FIG. 4A.

The transmitter 10 determines one signal point in accordance with the mapping for the I channel and the mapping for the Q channel. The transmitter 10 transmits a symbol by means of the determined signal point. An optical signal output from the transmitter 10 is transmitted to the receiver via an optical transmission line. Although FIG. 3 illustrates that the I channel and the Q channel are separated from each other, a 16QAM signal obtained by combining the I channel and the Q channel will be transmitted in reality.

The receiver 20 includes an LDPC decoder 21, a BCH decoder 22, and a frame generator 23. As with the transmitter 10, the receiver 20 performs a decoding process for each of the I channel and the Q channel.

The LDPC decoder 21 performs LDPC decoding for a received signal. LDPC decoding is performed for an L0 bit string. As a result, the L0 bit string will be recovered. The BCH decoder 22 performs BCH decoding for the received signal by using the L0 bit string recovered by the LDPC decoder 21. As a result, the L0 bit string and an L1 bit string will be recovered. These decoding processes are performed for each of the channels. Thus, an I-channel bit string and a Q-channel bit string are recovered. Then, transmission data is recovered from the I-channel bit string and the Q-channel bit string.

As described above, in the communication system 100, data is transmitted by means of multilevel coding. Note that when deciding symbols, an error tends to occur in LSBs (L0 bits in this example) more easily than in MSBs (L1 bits in this example).

Figure 6:
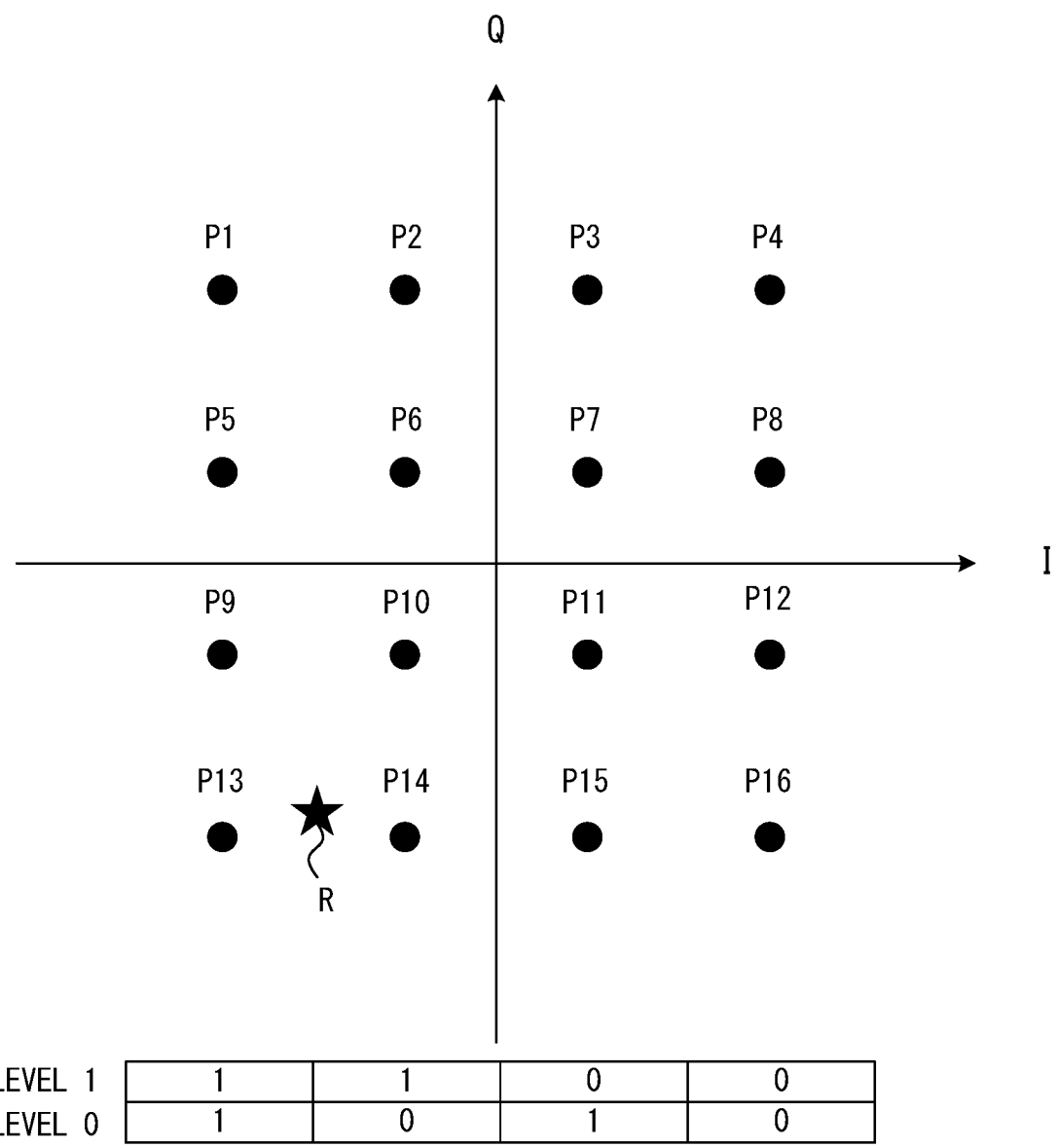
FIG. 6 illustrates an example of a decision process performed by a receiver depicted in FIG. 3.

FIG. 6 illustrates an example of a decision process performed by the receiver 20 depicted in FIG. 3. Assume, for example, that a symbol transmitted from the transmitter 10 by using the signal point P13 indicated in FIG. 6 has been detected at a reception point R by the receiver 20. In this case, the receiver 20 decides data allocated to the received symbol by detecting the closest signal point to the reception point R. For example, in the decision for the I channel, the distance between the reception point R and the signal point P13 may be compared with the distance between the reception point R and the signal point P14. Assume that the incorrect decision result (i.e., signal point P14) is obtained. In this case, even though the transmission data of the I channel is "11," the receiver 20 will recover "10." That is, the LSB is incorrect. However, both of the MSBs of the signal points P13 and P14 are "1," and an error will not occur. Thus, an error tends to occur at the LSB more easily than the other bits (in this case, MSB).

Accordingly, multilevel coding is such that a coding scheme with a high error correction capability is used for a bit string in which an error tends to occur. Thus, an LDPC code is used for an LSB bit string. Hence, data reliability is enhanced.

However, coding schemes with a high correction capability typically involve large power consumption. For example, data encoded by LDPC codes may preferably be recovered through iterative processing using soft decision information. The iterative processing involves large power consumption.

The transmitter 10 depicted in FIG. 3 performs coding for each of the I channel and the Q channel. The receiver 20 depicted in FIG. 3 performs decoding for each of the I channel and the Q channel. Hence, for example, the communication system 100 using 16QAM may perform LDPC coding for one of two bits for the I channel and perform LDPC coding for one of two bits for the Q channel. Thus, LDPC coding is performed for two of four bits allocated to each symbol, thereby increasing power consumption.

First Embodiment

Figure 7:
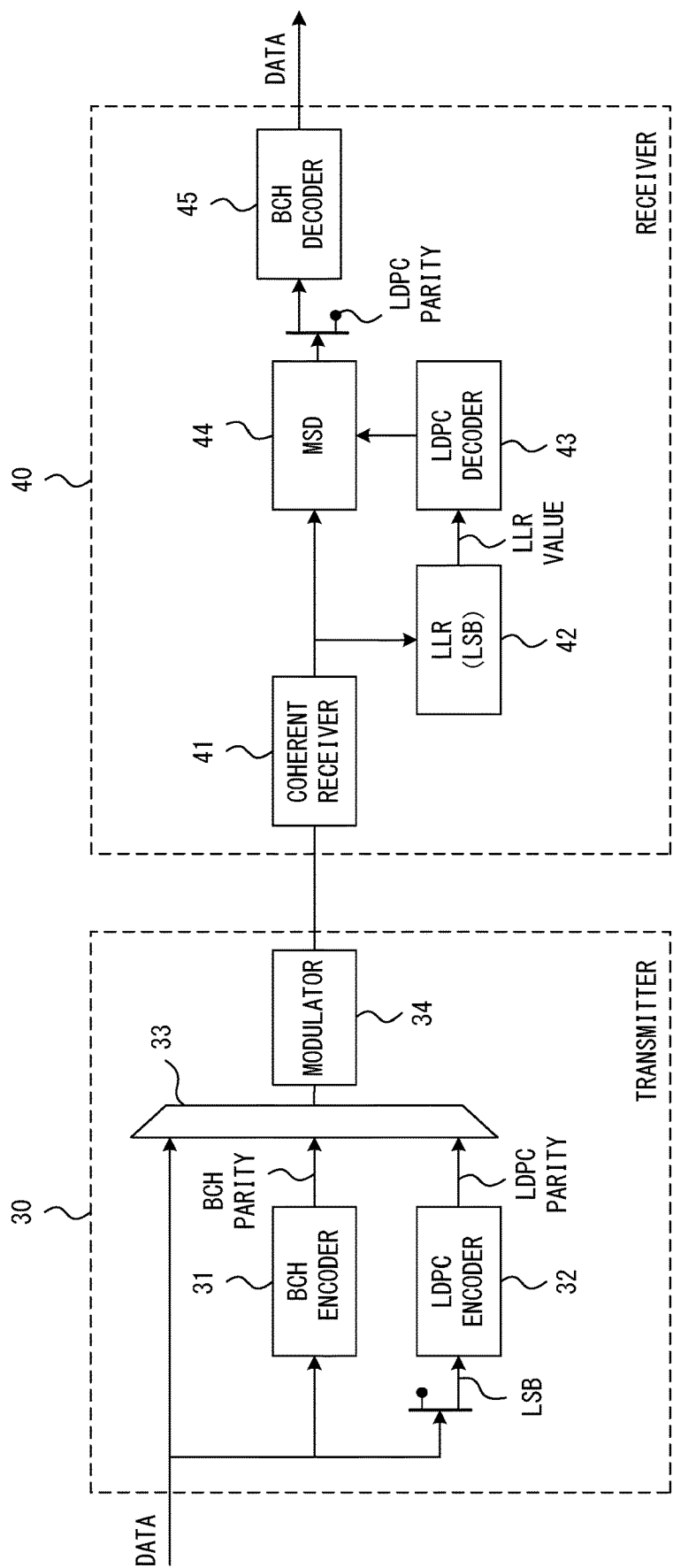
FIG. 7 illustrates an example of a transmitter and a receiver in accordance with a first embodiment of the invention.

FIG. 7 illustrates an example of a transmitter and a receiver in accordance with a first embodiment of the invention. The transmitter 30 and the receiver 40 depicted in FIG. 7 respectively correspond to the transmitter 4 implemented in the communication device 1A and the receiver implemented in the communication device 1B in the communication system 100 depicted in FIG. 1. In this example, the transmitter 30 transmits data with 16QAM. In 16QAM, four bits are allocated to each symbol. Thus, each symbol carries four bits.

The transmitter 30 includes a BCH encoder 31, an LDPC encoder 32, a frame generator 33, and a modulator 34. Although the transmitter 10 depicted in FIG. 3 includes two BCH encoders 11, two LDPC encoders 12, two frame generators 13, and two modulators 14, the transmitter 30 in accordance with the first embodiment of the invention includes one BCH encoder 31, one LDPC encoder 32, one frame generator 33, and one modulator 34.

Operations of the BCH encoder 31, the LDPC encoder 32, the frame generator 33, and the modulator 34 are almost the same as those of the BCH encoders 11, the LDPC encoders 12, the frame generators 13, and the modulators 14 depicted in FIG. 3. However, while the configuration depicted in FIG.

is such that the I channel and the Q channel are individually coded, the first embodiment of the present invention is such that transmission data is coded without being divided into an I channel and a Q channel.

Figure 8A:
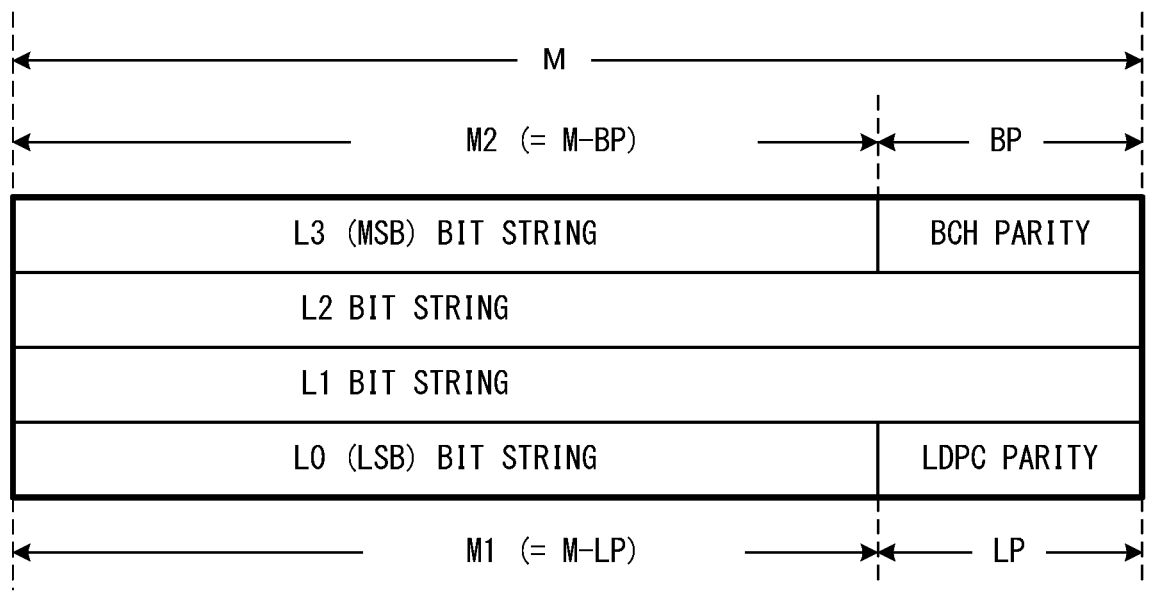
FIGS. 8A-8C illustrate an example of coding in accordance with a first embodiment of the invention.
Figure 8B:
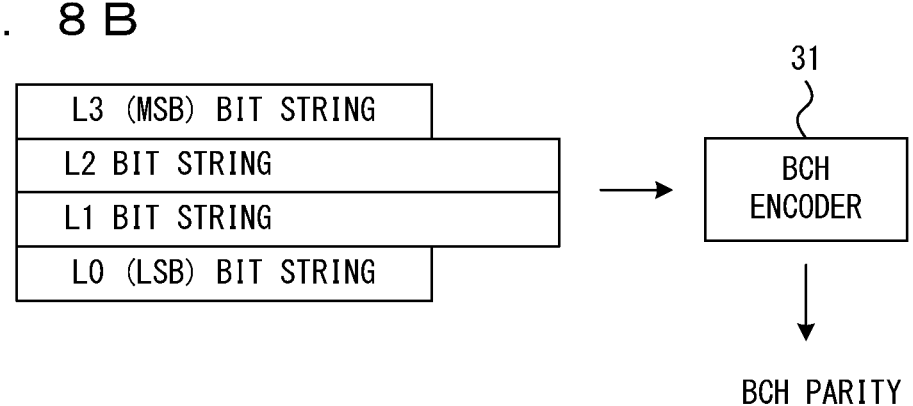
Figure 8C:
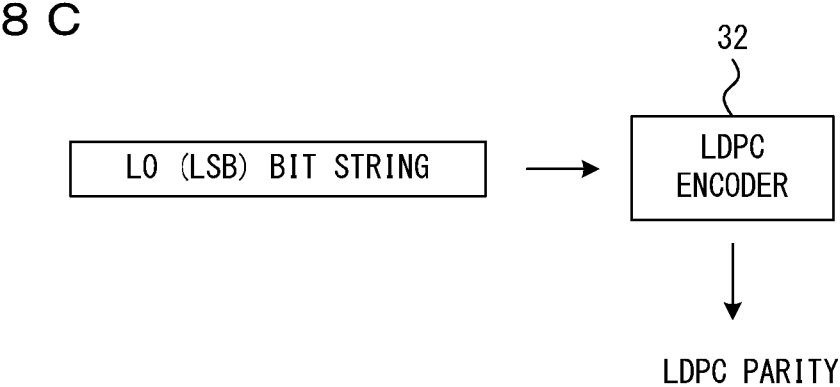

FIGS. 8A-8C illustrate an example of coding in accordance with the first embodiment of the invention. For example, although not particularly limited, transmission data may be stored in a data frame depicted in FIG. 8A and transmitted from the transmitter 30 to the receiver 40. Since 16QAM transmits four bits per symbol, the data frame is formed from four bit levels (L0-L3). The length of the data frame is M symbols.

Transmission data is stored in a level L0 region to a level L3 region. However, LDPC parity bits are stored in a portion of the level L0 region. When the length of the LDPC parity bits is LP bits, (M-LP) bits of data are stored in the level L0 region. BCH parity bits are stored in a portion of the level L3 region. When the length of the BCH parity bits is BP bits, (M-BP) bits of data are stored in the level L3 region. Thus, the data frame stores (4M-LP-BP) bits of transmission data.

Accordingly, when transmission data generated by an application is greater than (4M-LP-BP) bits, the transmission data will be supplied (4M-LP-BP) bits at a time to the transmitter 30. When transmission data is less than (4M-LP-BP) bits, a dummy bit or padding may be added to the transmission data. The data input to the transmitter 30 is guided to the BCH encoder 31, the LDPC encoder 32, and the frame generator 33.

The BCH encoder 31 generates a BCH parity by performing BCH coding for transmission data. In particular, as depicted in FIG. 8B, the BCH encoder 31 generates a BCH parity by performing BCH coding for an L0 (LSB) bit string, an L1 bit string, an L2 bit string, and an L3 (MSB) bit string. Specifically, the BCH encoder 31 generates a BCH parity by performing BCH coding for data to be stored in a level L0 region, data to be stored in a level L1 region, data to be stored in a level L2 region, and data to be stored in a level L3 region. Note that a code rate may be determined in advance. The BCH parity is an example of a BCH code. For example, the BCH encoder 31 may be implemented by a digital circuit that generates a BCH parity by performing BCH coding for an input bit string. However, the BCH encoder 31 may be implemented by a processor executing a software program.

The LDPC encoder 32 generates an LDPC parity by encoding a bit string formed from a specified bit among four bits allocated to each symbol in transmission data. For example, the specified bit may be a least significant bit (LSB). In this case, as depicted in FIG. 8C, the LDPC encoder 32 generates an LDPC parity by performing LDPC coding for an L0 (LSB) bit string. Specifically, the LDPC encoder 32 generates an LDPC parity by performing LDPC coding for data to be stored in a level L0 region. Note that the code rate may be determined in advance. The LDPC parity is an example of an LDPC code. For example, the LDPC encoder 32 may be implemented by a digital circuit that generates an LDPC parity by performing LDPC coding for the L0 (LSB) bit string in transmission data. However, the LDPC encoder 32 may be implemented by a processor executing a software program.

The frame generator 33 generates a data frame including transmission data (L0-L3 bit strings), a BCH parity, and an LDPC parity. Accordingly, the data frame depicted in FIG. 8A is generated from transmission data, a BCH parity, and an LDPC parity. In this case, the LDPC parity generated for the L0 (LSB) bit string is stored in the level L0 region. Thus, the LDPC parity is transmitted using the LSB. The BCH parity is stored in a region other than the level L0 region. Thus, the BCH parity is transmitted using a bit other than the L0 bit. In this example, the BCH parity is transmitted using the L3 (MSB) bit. The frame generator 33 is implemented by a digital circuit that generates data frames in the above-described manner. However, the frame generator 33 may be implemented by a processor executing a software program.

FIGS. 9A and 9B illustrate an example of a mapping rule according to 16QAM. The modulator 34 generates a modulated signal by mapping the symbols in a data frame generated by the frame generator 33 to signal points of 16QAM. In particular, in accordance with the mapping rule depicted in FIG. 9A, transmission symbols are two-dimensionality mapped to signal points each corresponding to a four-bit value forming a symbol. For example, a transmission symbol formed from four bits of "0110" may be mapped to the signal point P13. For example, a transmission symbol formed from four bits of "0111" may be mapped to the signal point P14. In this example, a left end bit is an MSB (L3 bit), and a right end bit is an LSB (L0 bit).

As indicated in FIG. 9B, the modulator 34 performs mapping such that each pair of adjacent signal points are different from each other in terms of the values of L0 bits. That is, values of L0 bits of arbitrary adjacent signal points are different from each other. For example, the signal points P13 and P14 are adjacent to each other in an I-axis direction. The LSB of a symbol mapped to the signal point P13 is "0," and the LSB of a symbol mapped to the signal point P14 is "1." The signal points P9 and P13 are adjacent to each other in a Q-axis direction. The LSB of a symbol mapped to the signal point P9 is "1," and the LSB of a symbol mapped to the signal point P13 is "0." In this way, the modulator 34 performs mapping such that each pair of signal points adjacent to each other in any of the directions of coordinate axes in the two-dimensional coordinate in which signal points corresponding to 16QAM are arranged are different from each other in terms of the value of a specified one bit (least significant bit in examples) among four bits forming a symbol.

For the other bits (L1-L3), as depicted in FIG. 9B, mapping is performed such that the values are equal as much as possible between adjacent signal points. In this example, for the L1 (level 1) bits, signal-point values belonging to the two columns on the negative side are "1," and signal-point values belonging to the two columns on the positive side are "0." For the L2 (level 2) bits, signal-point values belonging to the first and fourth rows are "1," and signal-point values belonging to the second and third rows are "0." For the L3 (MSB: level 3) bits, signal-point values belonging to the first and second rows are "1," and signal-point values belonging to the third and fourth rows are "0." For the L1-L3 bits, it is also preferable that the values be equal as much as possible between signal points diagonally adjacent to each other.

The modulator 34 generates, for each transmission symbol, an optical signal having an amplitude and a phase that correspond to a signal point to which the transmission symbol is mapped. The optical signal is transmitted to the receiver 40 via an optical transmission line. In the meantime, the modulator 34 includes a circuit for generating a drive signal representing a determined signal point and an optical modulator for generating an optical signal based on the drive signal.

Note that the BCH encoder 31 and the LDPC encoder 32 correspond to the encoder circuit 4b depicted in FIG. 2.

Figure 10:
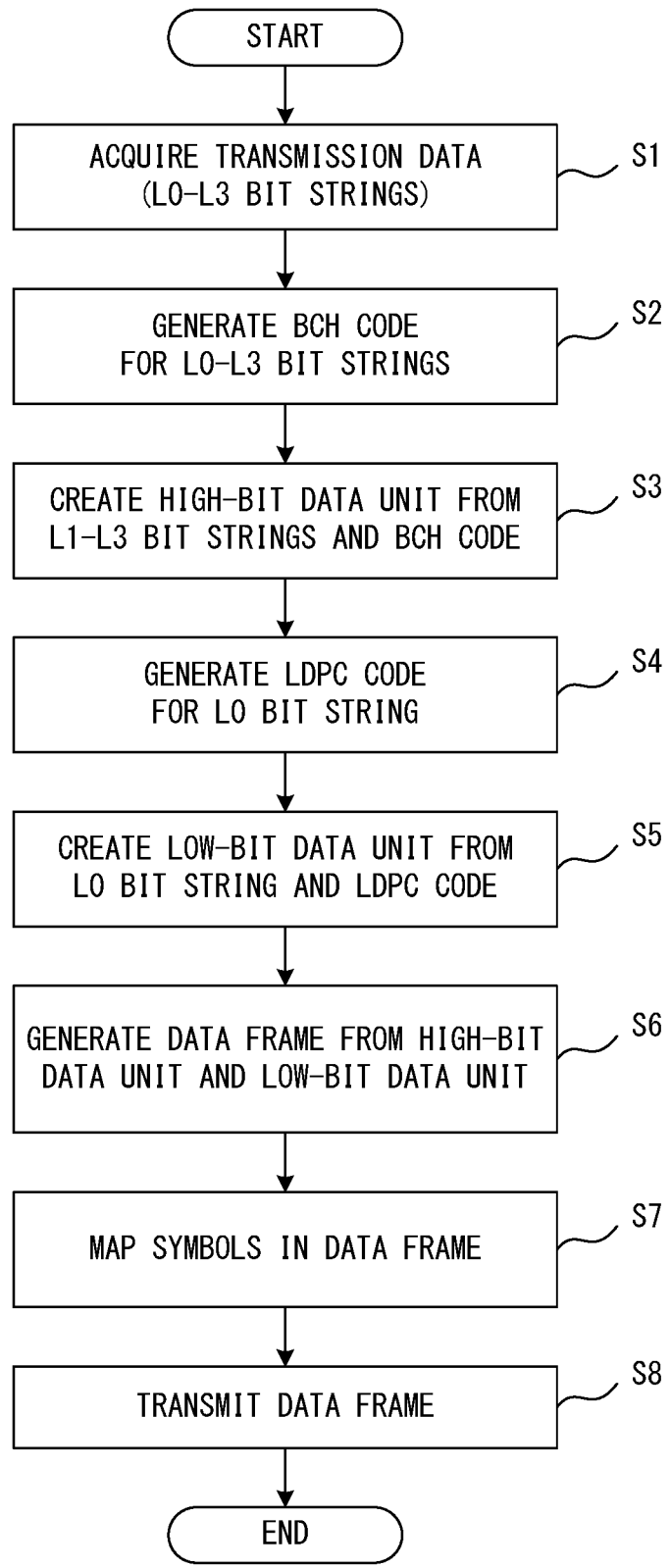
FIG. 10 is a flowchart illustrating an example of operations of a transmitter.

FIG. 10 is a flowchart illustrating an example of operations of the transmitter 30. The processes of this flowchart are performed when the communication device 1 has generated transmission data. Alternatively, the transmitter 30 may perform the processes of the flowchart depicted in FIG. 10 when probabilistic shaping (PS) is not performed.

In S1, the transmitter 30 acquires transmission data. The transmission data corresponds to the L0-L3 bit strings depicted in FIG. 8A. In S2, the BCH encoder 31 generates a BCH parity (or BCH code) by performing BCH coding for the L0-L3 bit strings. In particular, the BCH encoder 31 generates a BCH parity by performing BCH coding for data to be stored in a level L0 region to a level L3 region. In S3, the frame generator 33 generates a high-bit data unit for a data frame from the L1-L3 bit strings and the BCH code. In particular, the frame generator 33 creates the level L1 region, the level L2 region, and the level L3 region for the data frame by storing the L1 bit string in the level L1 region, storing the L2 bit string in the level L2 region, and storing the L3 bit string and the BCH parity in the level L3 region.

In S4, the LDPC encoder 32 generates an LDPC parity (or LDPC code) by performing LDPC coding for the L0 bit string. In particular, the LDPC encoder 32 generates an LDPC parity by performing LDPC coding for data to be stored in the level L0 region. In S5, the frame generator 33 generates a low-bit data unit for the data frame from the L0 bit string and the LDPC code. In particular, the frame generator 33 creates the level L0 region for the data frame by storing the L0 bit string and the LDPC parity in the level L0 region.

In S6, the frame generator 33 generates the data frame from the high-bit data unit created through S2-S3 and the low-bit data unit created through S4-S5. In S7, the modulator 34 maps each of the symbols in the data frame to a corresponding signal point. In this case, for example, each of the symbols may be mapped to a corresponding signal point in accordance with the mapping rule depicted in FIGS. 9A and 9B. In S8, the transmitter 30 sequentially transmits the symbols in the data frame.

The receiver 40 includes a coherent receiver 41, a log-likelihood-ratio (LLR) calculator 42, an LDPC decoder 43, a multi-stage decoder (MSD) 44, and a BCH decoder 45. The receiver 40 receives a data frame transmitted from the transmitter 30.

The coherent receiver 41 generates electric field information indicating a received optical signal. In particular, the coherent receiver 41 generates electric field information indicating the phases and amplitudes of received symbols. The coherent receiver 41 includes a local light source, a 90-degree optical hybrid circuit, an optical receiver circuit, and the like. The coherent receiver 41 may have a function for compensating for dispersion in an optical transmission line, a function for compensating for the difference between the carrier frequency of an optical signal and the frequency of the local light source, and the like.

The LLR calculator 42 calculates the value of a log likelihood ratio (LLR) by performing a soft decision for a received signal. In particular, the LLR calculator 42 calculates the LLR values of received symbols. However, the LLR calculator 42 does not calculate LLR values for all bits of each of the received symbols but calculates LLR values only for the LSBs of the received symbols. Thus, in the case of the data frame depicted in FIG. 8A, an LLR value is calculated for the bits in the L0 (LSB) bit string and the LDPC parity.

An LLR value indicates the logarithm of the ratio between the probability that a received signal was "1" at a transmitter and the probability that the received signal was "0" at the transmitter. Thus, the LLR value is calculated according to reception electric field information indicating the phase and amplitude of a received symbol. In particular, the LLR value is calculated according to the distances between the received symbol and signal points (16 signal points in the case of 16QAM). In the meantime, the LLR calculator 42 is implemented by, for example, a digital circuit that calculates an LLR value. In this case, the digital circuit may include a circuit for storing a relation between the electric field information and the LLR value of a received symbol. The LLR calculator 42 may also be implemented by a processor executing a software program.

The LDPC decoder 43 performs LDPC decoding based on a soft decision result output from the LLR calculator 42. In particular, the LDPC decoder 43 performs LDPC decoding by using the LLR value of the bits in the L0 (LSB) bit string and the LDPC parity. In this case, the LDPC decoder 43 performs, for example, probability propagation decoding. A probability propagation decoding algorithm includes iterative processing of updating the LLR value of the bits until a parity check is satisfied. Decision results obtained for the bits when the parity check is satisfied are output as decoding results. As a result, the bits in the L0 (LSB) bit string and the LDPC parity are recovered. Note that the probability propagation decoding algorithm may stop the iterative processing when the number of iterations has reached a specified maximum value. In this case, the bits in the L0 (LSB) bit string and the LDPC parity are decided according to the updated LLR value of the bits obtained when the iterative processing reaches the specified maximum value. In the meantime, the LDPC decoder 43 is implemented by, for example, a digital circuit that performs the decoding process. However, the LDPC decoder 43 may be implemented by a processor executing a software program.

The multi-stage decoder 44 demaps received symbols according to electric field information indicating received optical signal. In this case, the multi-stage decoder 44 converts each received symbol into four bits of data in accordance with the mapping rule depicted in FIGS. 9A and 9B. However, the L0 bit of the four bits forming each symbol has been decided by the LDPC decoder 43. Accordingly, the multi-stage decoder 44 demaps the received symbols by using decision results provided by the LDPC decoder 43. Note that the multi-stage decoder 44 is implemented by, for example, a digital circuit that recovers the data. However, the multi-stage decoder 44 may be implemented by a processor executing a software program.

Assume, for example, that a received symbol has been detected at the point R depicted in FIG. 6. In this case, the multi-stage decoder 44 detects the closest signal point to the reception point R so as to decide the signal point used by the transmitter 30. However, in this example, the distance between the reception point R and the signal point P13 and the distance between the reception point R and the signal point P14 are almost equal. Thus, an incorrect decision result could be obtained if a decision result provided by the LDPC decoder 43 is not used.

Accordingly, the multi-stage decoder 44 uses a decision result provided by the LDPC decoder 43. In this example, the decision result provided by the LDPC decoder 43 is "0." That is, the least significant bit of the four bits corresponding to the received symbol is "0." Since the LDPC decoder 43 performs a parity check, the reliability of the decision result provided by the LDPC decoder 43 is high. Meanwhile, as depicted in FIG. 9A, the high three bits of the four bits corresponding to each of the signal points P13 and P14 are "011." Thus, the decision result of the received symbol is "0110." In this example, high bits are mapped such that values are equal as much as possible between adjacent signal points, as described above by referring to FIGS. 9A and 9B. Hence, the probability of occurrence of an error in the abovementioned bits will be low.

The symbols in a data frame are decided in the manner described above. Specifically, the L0-L3 bit strings, the LDPC parity, and the BCH parity depicted in FIG. 8A are recovered.

The BCH decoder 45 performs BCH decoding for a decision result provided by the multi-stage decoder 44. However, the transmitter 30 generates a BCH parity for L0-L3 bit strings. Thus, an LDPC parity is discarded, and the BCH decoder 45 uses the BCH parity so as to check the L0-L3 bit strings output from the multi-stage decoder 44. In this case, any errors detected will be corrected. As a result, transmission data will be recovered. In the meantime, the BCH decoder 45 is implemented by, for example, a digital circuit that performs the decoding process. However, the BCH decoder 45 may be implemented by a processor executing a software program.

As described above, the receiver 40 depicted in FIG. 7 collectively decodes a plurality of bits forming each received symbol, unlike the receiver 20 depicted in FIG. 3. Thus, the receiver 40 depicted in FIG. 7 has fewer bits for which iterative processing using soft decision information is performed than the receiver 20 depicted in FIG. 3. In particular, the receiver 20 depicted in FIG. 3 performs, for each of the I channel and the Q channel, the iterative processing using soft decision information for one of two bits. That is, the receiver 20 depicted in FIG. 3 performs the iterative processing using soft decision information for two of four bits. On the other hand, the receiver 40 depicted in FIG. 7 performs the iterative processing using soft decision information for one of four bits. In this regard, the iterative processing using soft decision information involves large power consumption. Accordingly, the first embodiment of the invention has reduced power consumption in multilevel coding communication.

The LLR calculator 42, the LDPC decoder 43, the multi-stage decoder 44, and the BCH decoder 45 correspond to the decoder circuit 5c depicted in FIG. 2. The coherent receiver 41 corresponds to the optical receiver 5a and the demodulator circuit 5b depicted in FIG. 2.

Figure 11:
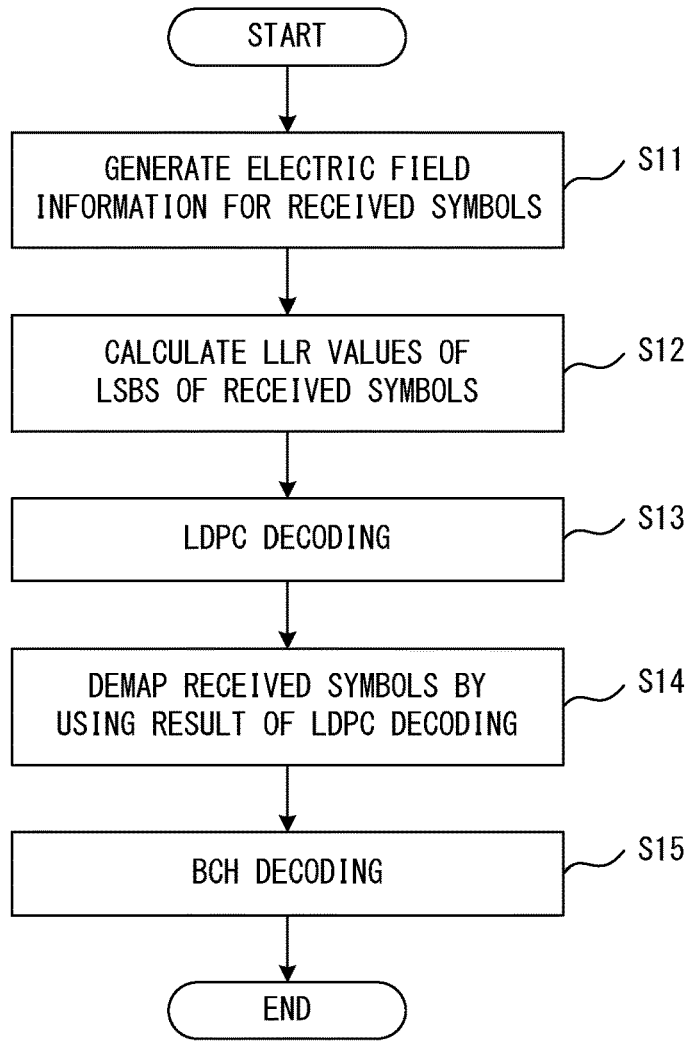
FIG. 11 is a flowchart illustrating an example of operations of a receiver.

FIG. 11 is a flowchart illustrating an example of operations of the receiver 40. The receiver 40 receives an optical signal transmitted from the transmitter 30 depicted in FIG. 7.

In S11, the coherent receiver 41 generates electric field information for received symbols. The electric field information indicates the phases and amplitudes of the received symbols. In S12, the LLR calculator 42 performs a soft decision for each of the received symbols according to the electric field information indicating the received optical signal. In particular, the LLR values of the received symbols are calculated. However, the LLR calculator 42 may calculate LLR values only for the LSBs of the received symbols.

In S13, the LDPC decoder 43 performs LDPC decoding based on a soft decision result output from the LLR calculator 42. As a result, the bits in an L0 bit string and an LDPC parity are recovered. In S14, the multi-stage decoder 44 demaps the received symbols according to the electric field information indicating the received optical signal. In this case, the multi-stage decoder 44 demaps the received symbols by using a decision result provided by the LDPC decoder 43. As a result, the bits in the L0-L3 bit strings and the BCH parity are recovered. In S15, the BCH decoder 45 uses the BCH parity so as to decode the L0-L3 bit strings output from the multi-stage decoder 44. In particular, error detection and error correction are performed for the L0-L3 bit strings by using the BCH parity. As a result, the transmission data is recovered.

Variation of First Embodiment

In the examples described above, data is transmitted with 16QAM. However, the present invention is not limited to this. In particular, the first embodiment of the invention can be applied to any quadrature amplitude modulation. Specifically, the first embodiment of the invention can be applied to quadrature amplitude modulation in which N (N is an integer larger than or equal to 4) bits are allocated to each symbol.

FIGS. 12A-12C illustrate an example of coding according to 64QAM. For example, in 64QAM, six bits are allocated to each symbol. Thus, in a 64QAM communication system, a transmitter 30 transmits a data frame depicted in FIG. 12A to a receiver 40. In this case, BCH encoder 31 generates a BCH parity by performing BCH coding for input bit strings (i.e., L0-L5 bit strings), as depicted in FIG. 12B. The LDPC encoder 32 generates an LDPC parity by performing LDPC coding for the L0 (LSB) bit string of the input bit strings, as depicted in FIG. 12C. The BCH parity and the LDPC parity are respectively stored in the level L5 region and the level L0 region in the data frame.

Figure 13:
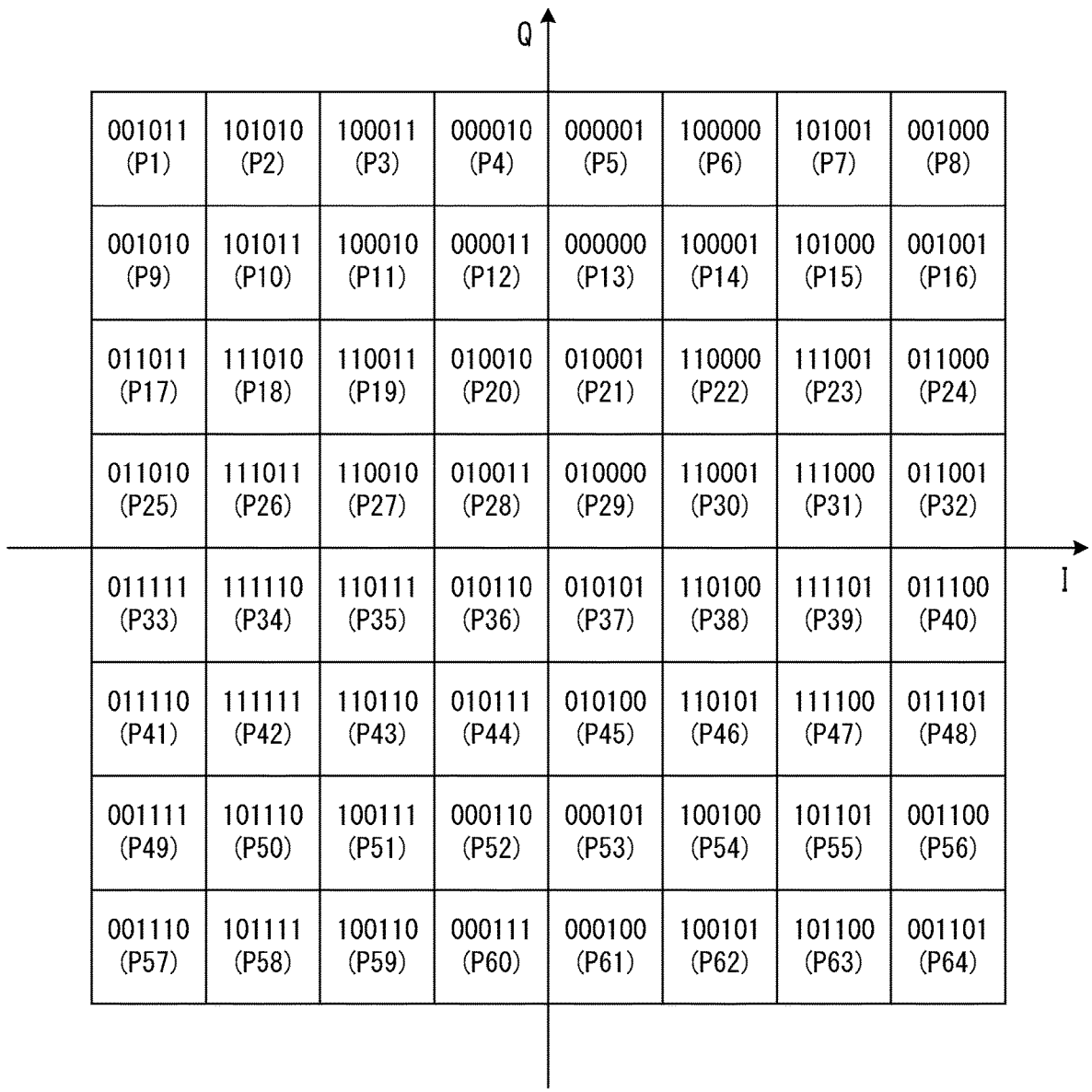
FIG. 13 illustrates an example of a mapping rule for 64QAM.

FIG. 13 illustrates an example of a mapping rule for 64QAM. FIG. 14 illustrates the mapping rule depicted in FIG. 13 separately for each bit.

As in the case of 16QAM, mapping is also performed in 64QAM such that the values of L0 bits are different between adjacent signal points. For the other bits (L1-L5), mapping is performed such that the values are equal as much as possible between adjacent signal points.

Flowcharts indicating operations of the transmitter 30 are substantially the same for 16QAM and 64QAM. However, the 64QAM communication system is such that the transmitter 30 acquires L0-L5 bit strings in S1, the BCH encoder 31 generates BCH codes for the L0-L5 bit strings in S2, and the frame generator 33 generates a high-bit data unit from the L0-L5 bit strings and the BCH parity in S3.

Flowcharts indicating operations of the receiver 40 are substantially the same for 16QAM and 64QAM. However, the 64QAM communication system is such that the multi-stage decoder 44 recovers the bits in L0-L5 bit strings and a BCH parity in S14, and the BCH decoder 45 decodes the L0-L5 bit strings by using the BCH parity in S15.

In the examples described above, multiple coding uses BCH code and LDPC code. However, the invention is not limited to this method. In particular, the communication system 100 can use a plurality of desired coding schemes for multilevel coding. However, the communication system 100 preferably uses two coding schemes with different error correction capabilities. In this case, for example, Reed-Solomon code may be used instead of BCH code. For example, turbo code may be used instead of LDPC code. Furthermore, signals that have been encoded using a coding scheme with a high error correction capability is preferably decoded by the receiver 40 through iterative processing using soft decision information.

In the examples described above, LDPC code is used for least significant bits. However, the invention is not limited to this configuration. In particular, an LDPC code may be used for any one of a plurality of bits allocated to each symbol.

In the examples described above, the coding scheme for encoding least significant bits has a higher error correction capability than the coding scheme for encoding the entirety of data. However, the invention is not limited to this configuration. In particular, the only requirement is that the coding scheme for encoding the entirety of data be different from the coding scheme for encoding least significant bits.

Second Embodiment

In a quadrature amplitude modulation scheme such as 16QAM or 64QAM, the transmission power of each symbol is dependent on the distance between the center of a constellation and the symbol. In particular, the transmission power of a symbol positioned close to the center of the constellation is low, and the transmission power of a symbol positioned far from the center of the constellation is high.

Probabilistic shaping controls the probability of occurrence of each symbol by converting the values of an input bit string. In this example, probabilistic shaping converts the values of an input bit string such that the probability of occurrence of a symbol positioned close to the center of the constellation is high. In this way, transmission power can be reduced and/or a signal-to-noise ratio can be enhanced. Note that probabilistic shaping may hereinafter be referred to as "PS." A method for reducing power consumption by using probabilistic shaping is described in, for example, Japanese Laid-open Patent Publication No. 2020-188357.

Figure 15:
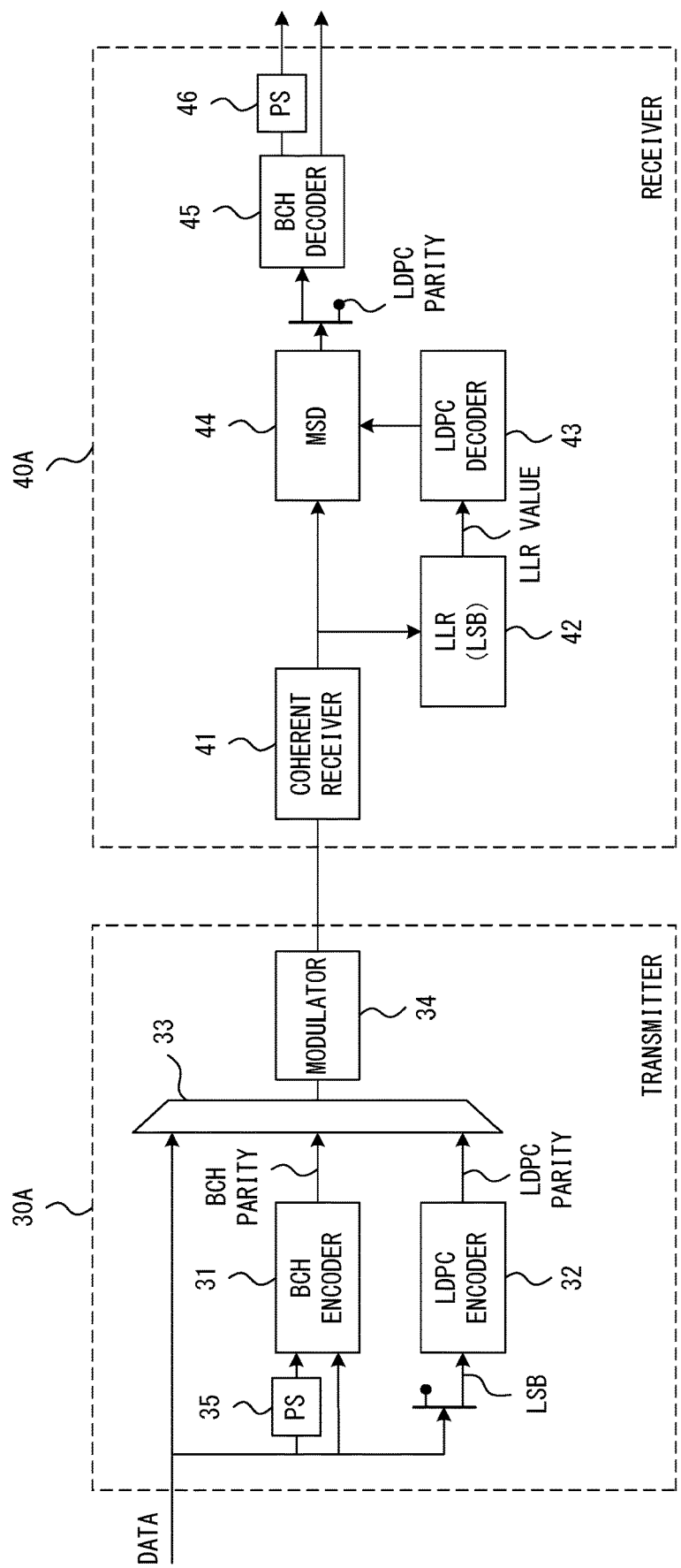
FIG. 15 illustrates an example of a transmitter and a receiver in accordance with a second embodiment of the invention.

FIG. 15 illustrates an example of a transmitter and a receiver in accordance with a second embodiment of the invention. A transmitter 30A and a receiver 40A depicted in FIG. 15 respectively correspond to the transmitter 4 implemented in the communication device 1A and the receiver implemented in the communication device 1B in the communication system 100 depicted in FIG. 1. In this example, the transmitter 30A transmits data with 16QAM.

The transmitter 30A includes a BCH encoder 31, an LDPC encoder 32, a frame generator 33, a modulator 34, and a PS processor 35. The BCH encoder 31, the LDPC encoder 32, the frame generator 33, and the modulator 34 in the second embodiment depicted in FIG. 15 are substantially the same as those in the first embodiment depicted in FIG. 7.

Figure 16A:
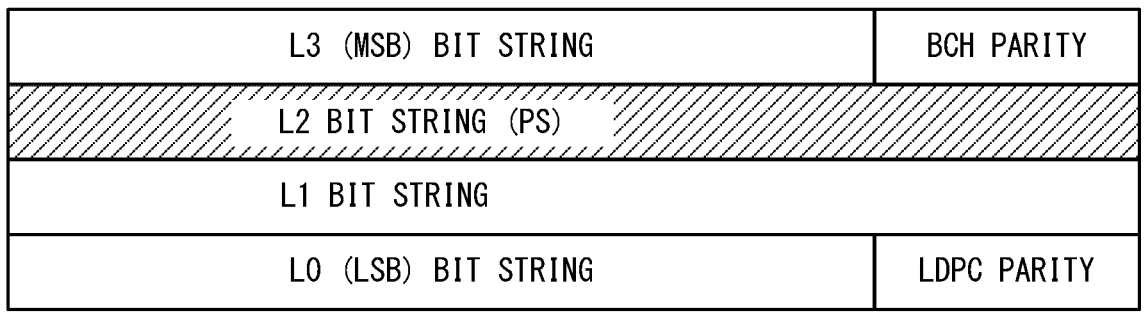
FIGS. 16A-16C illustrate an example of coding in accordance with a second embodiment of the invention.
Figure 16B:
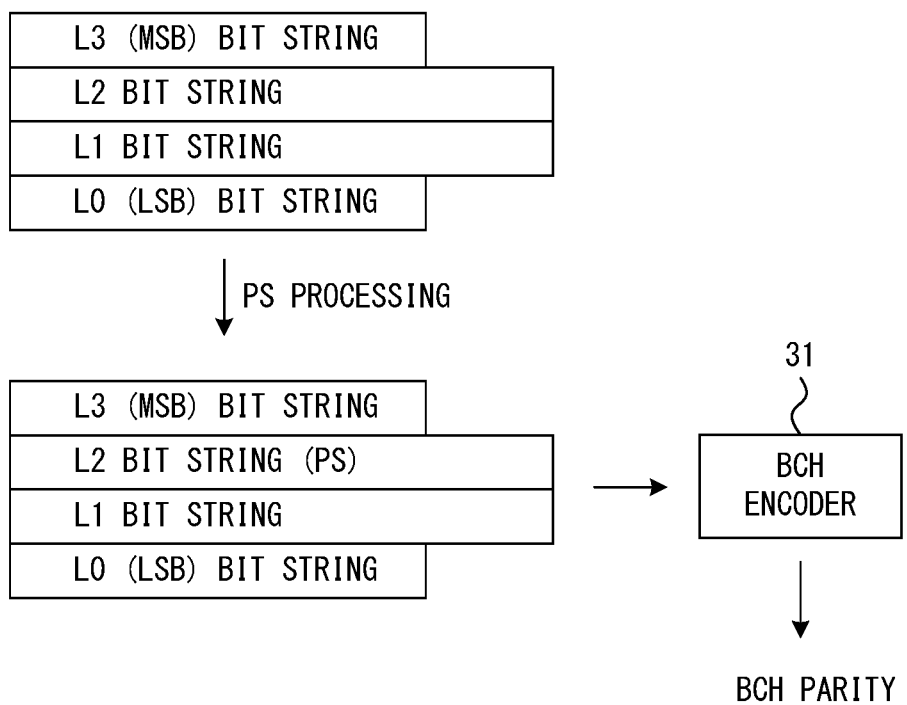
Figure 16C:
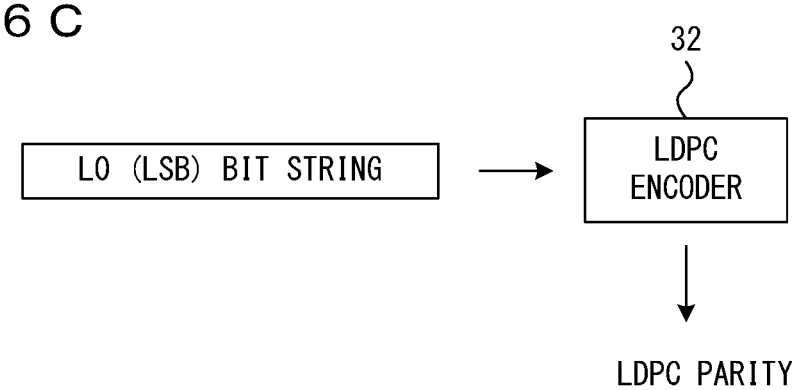

FIGS. 16A-16C illustrate an example of coding in accordance with the second embodiment of the invention. The configurations of frames for carrying data are substantially the same in the first and second embodiments. Thus, transmission data is stored in a data frame depicted in FIG. 16A and transmitted from the transmitter 30A to the receiver 40A. Since 16QAM transmits four bits per symbol, the data frame is formed from four bit levels (L0-L3).

In the second embodiment, the transmitter 30A includes the PS processor 35 in addition to the components of the transmitter 30 in accordance with the first embodiment. The PS processor 35 performs PS processing for an input bit string. However, the PS processor 35 does not perform PS processing for the entirety of an input bit string but performs PS processing for a portion of the input bit string. In this example, the PS processor 35 performs PS processing for data to be stored in the level L2 region of a data frame, as indicated in FIG. 16B. Note that a bit string to be stored in a level Li region (i=0 to 3) may hereinafter be referred to as a "Li bit string."

The BCH encoder 31 generates a BCH parity by performing BCH coding for data to be stored in the level L0 region, data to be stored in the level L1 region, data to be stored in the level L2 region after PS processing, and data to be stored in the level L3 region. As in the first embodiment, the LDPC encoder 32 generates an LDPC parity by performing LDPC coding for the data to be stored in the level L0 region, as indicated in FIG. 16C. As depicted in FIG. 16A, the LDPC parity is stored in the level L0 region, and the BCH parity is stored in the level L3 region.

In this example, the PS processor 35 performs PS processing for the L2 bit string, as indicated in FIG. 16B. A mark ratio of a bit string forming transmission data is typically about 50 percent. That is, in a bit string forming transmission data, the probability of occurrence of "0" is typically almost equal to that of "1." In PS processing, the bit values are converted such that the mark ratio of the bit string is shifted from 50 percent.

In this example, an L2 bit string is input to the PS processor 35, as indicated in FIG. 17. The mark ratio of the L2 bit string input to the PS processor 35 is about 50 percent. The PS processor 35 performs PS processing in accordance with a conversion rule determined in advance, such that the probability of occurrence of "0" is higher than the probability of occurrence of "1." As a result, the L2 bit string after PS processing includes more values "0" than values "1."

The PS processor 35 is an example of a converter that converts the values of transmission data such that a transmission symbol is mapped with a higher probability to a signal point located closer to the center of a constellation indicating quadrature amplitude modulation (in this example, 16QAM). The PS processor 35 may be implemented by a hardware circuit that converts the values of an input bit string in accordance with a conversion rule determined in advance. However, the PS processor 35 may be implemented by a processor executing a software program.

Figures 18A, 18B:
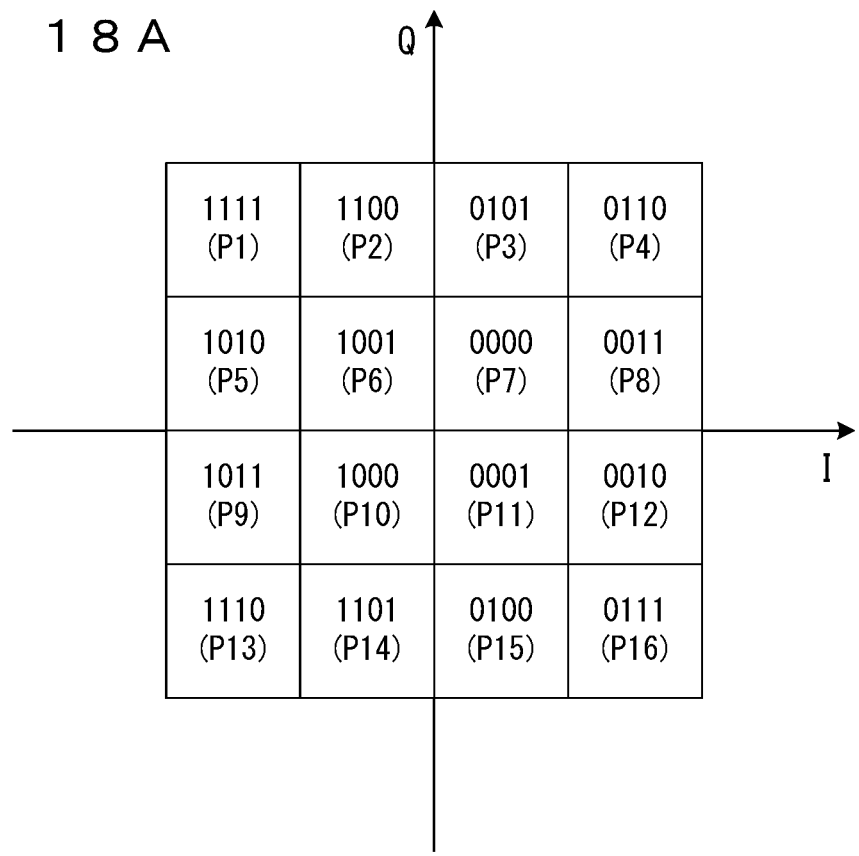
FIGS. 18A and 18B illustrate an example of a mapping rule for 16QAM in a second embodiment.

FIGS. 18A and 18B illustrate an example of a mapping rule for 16QAM in the second embodiment. As in the first embodiment, the mapping rule includes the following details.

(1) Each pair of adjacent signal points are different in terms of the values of bits in a bit string for including an LDPC parity.
(2) Each pair of adjacent signal points are equal as much as possible in terms of the values of bits in the other bit strings.

In this example, as depicted in FIG. 16A, an LDPC parity is stored in an L0 (LSB) bit string. Thus, each pair of signal points adjacent to each other in the I-axis direction and the Q-axis direction are respectively different in terms of the values of bits in the L0 bit string. The values of bits in L1-L3 bit strings are respectively determined such that each pair of adjacent signal points are equal as much as possible in terms of the values of bits in the bit strings.

The mapping rule in the second embodiment includes the following details in addition to (1) and (2) above. (3) By performing PS processing, "0" is disposed as much as possible at signal points close to the center of a constellation for a specified bit string.

In this example, PS processing is performed for the L2 bit string, as depicted in FIGS. 16A and 17. According to the mapping rule for the L2 bit string, as depicted in FIG. 18B, "0" is allocated to signal points belonging to second and third rows, and "1" is allocated to signal points belonging to first and fourth rows. That is, for the L2 bit string for which PS processing is performed, "0" is disposed as much as possible at signal points close to the center of the constellation.

The modulator 34 maps transmission symbols to corresponding signal points in accordance with the mapping rule depicted in FIGS. 18A and 18B. Thus, each transmission symbol is mapped to a signal point corresponding to the values of four bits forming the transmission symbol. For example, a transmission symbol having values of "1111" is mapped to a signal point P1, and a transmission symbol having values of "1010" is mapped to a signal point P5.

Figure 19A:
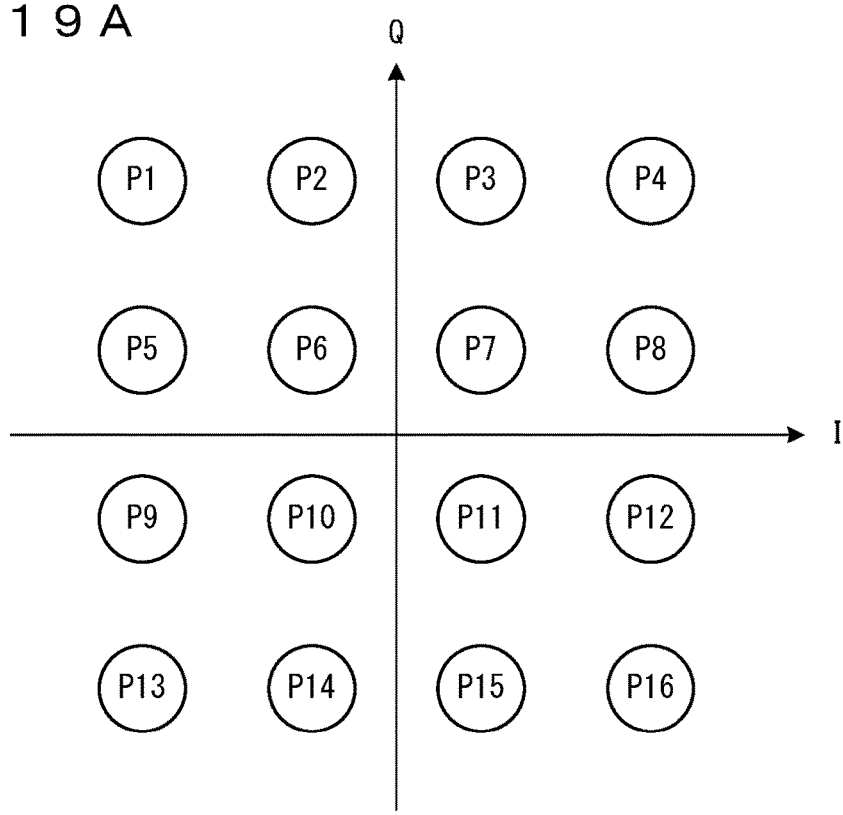
FIGS. 19A and 19B illustrate an example of the probabilities of use of 16QAM signal points.
Figure 19B:
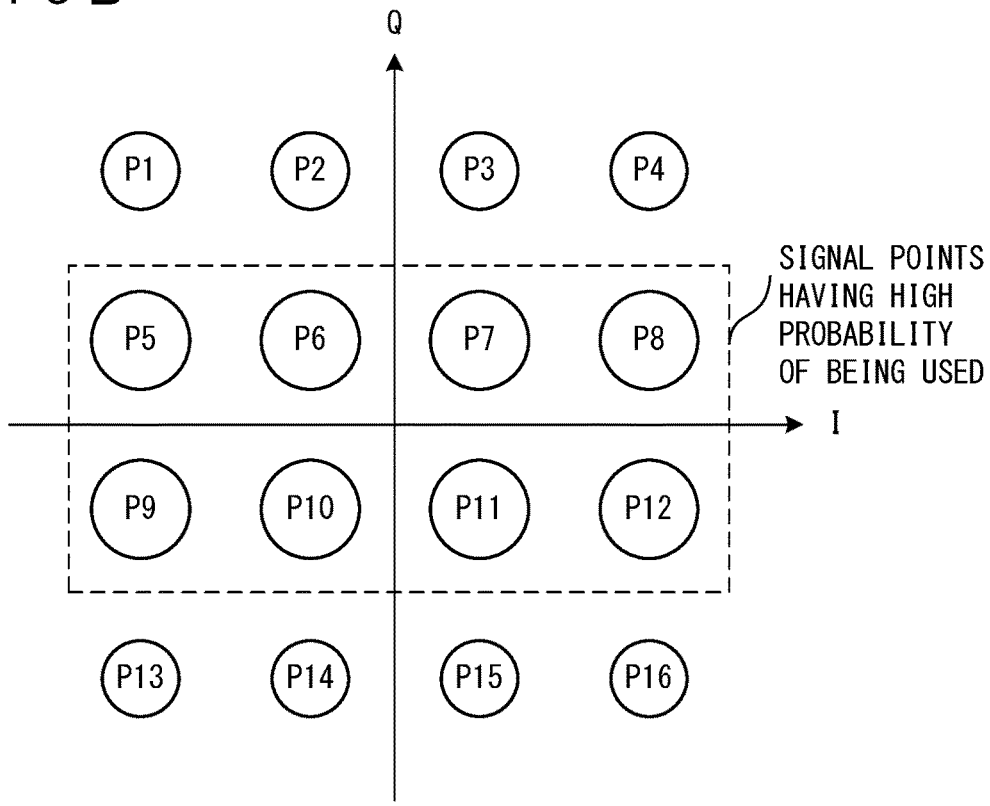

FIGS. 19A and 19B illustrate an example of the probabilities of use of 16QAM signal points. Circles indicated in FIGS. 19A and 19B correspond to signal points of 16QAM. The size of each circle indicates a probability with which a signal point is used. In particular, a signal point having a high probability of being used is represented by a large circle, and a signal point having a low probability of being used is represented by a small circle.

In this example, when PS processing is not performed for any of input bit strings, the mark ratios of L0-L3 bit strings are respectively about 50 percent. In this case, as depicted in FIG. 19A, transmission symbols are mapped equally to 16 signal points. Thus, the probabilities of use of 16 signal points are substantially equal.

By contrast, in the second embodiment, PS processing is performed for an L2 bit string. In particular, PS processing is performed for an L2 bit string such that the probability of occurrence of "0" is higher than the probability of occurrence of "1." In this regard, a transmission symbol having "0" in L2 bit is mapped to any signal point among the signal points P5-P12, as indicated in FIGS. 18A and 18B. Thus, when PS processing is performed for the L2 bit string such that the probability of occurrence of "0" is higher than the probability of occurrence of "1," the probabilities of use of the signal points P5-P12 are higher than those of the signal points P1-P4 and P13-P16, as indicated in FIG. 19B.

The signal points P5-P12 are located closer to the center of the 16QAM constellation than the signal points P1-P4 and P13-P16 are. Thus, the average transmission power of the signal points P5-P12 is lower than that of the signal points P1-P4 and P13-P16. Hence, the average power consumption of the transmitter 30A in accordance with the second embodiment is reduced in comparison with the transmitter 30 in accordance with the first embodiment. In other words, on the assumption that data is transmitted with equal average transmission power in the first and second embodiments, the second embodiment will attain an improved signal-to-noise ratio because the transmission power of each signal point can be high.

Figure 20:
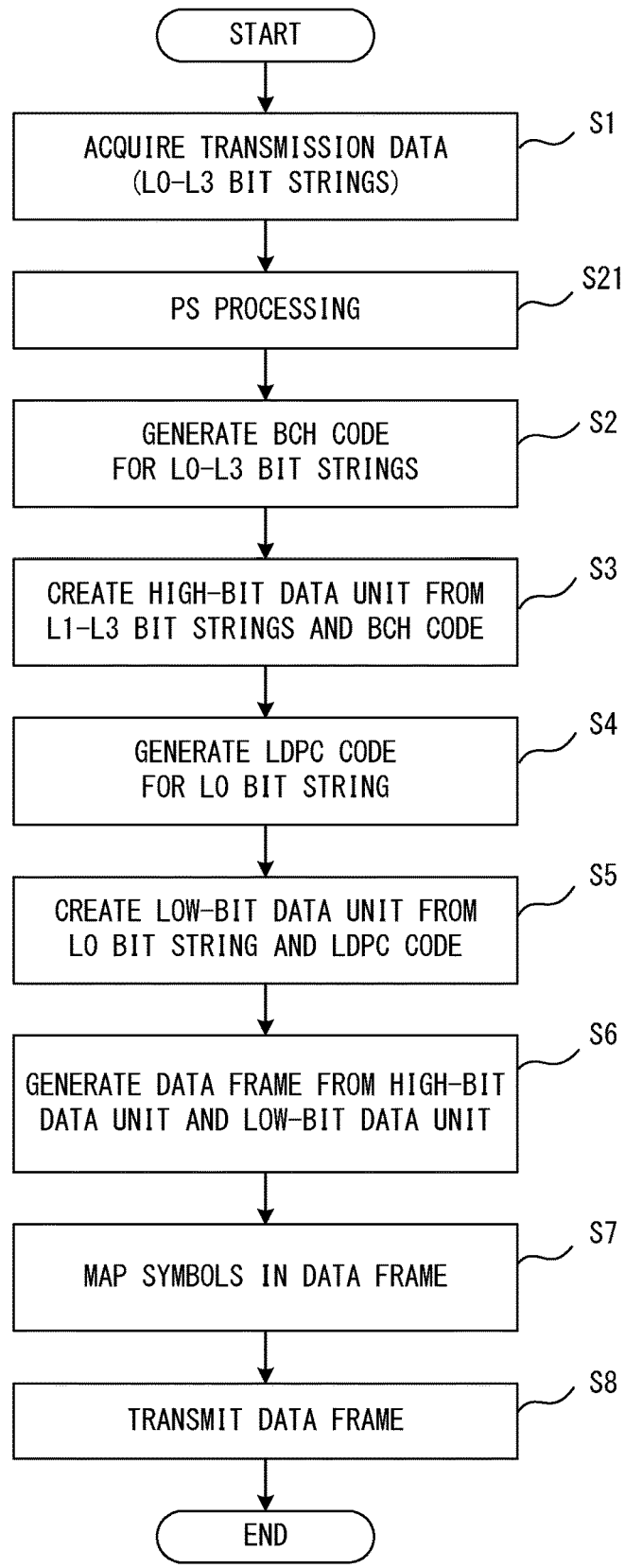
FIG. 20 is a flowchart illustrating an example of operations performed by a transmitter in a second embodiment.

FIG. 20 is a flowchart illustrating an example of operations performed by the transmitter 30A in the second embodiment. The processes of S1-S8 in the second embodiment are substantially the same as those in the first embodiment. Accordingly, in the second embodiment, the process of S21 is performed in addition to S1-S8 depicted in FIG. 10.

In S21, the PS processor 35 performs PS processing for an input bit string. In this example, the PS processor 35 performs PS processing for an L2 bit string in L0-L3 bit strings. In this example, PS processing is performed such that the probability of occurrence of "0" is higher than the probability of occurrence of "1." In S2, BCH codes are generated for data to be stored in a level L0 region, data to be stored in a level L1 region, data to be stored in a level L2 region after PS processing, and data to be stored in a level L3 region. The subsequent processes have already been described above by referring to FIG. 10.

As depicted in FIG. 15, the receiver 40A includes a coherent receiver 41, an LLR calculator 42, an LDPC decoder 43, a multi-stage decoder 44, a BCH decoder 45, and a PS processor 46. The receiver 40A receives a data frame transmitted from the transmitter 30A. The coherent receiver 41, the LLR calculator 42, the LDPC decoder 43, the multi-stage decoder 44, and the BCH decoder 45 in the second embodiment depicted in FIG. 15 are substantially the same as those in the first embodiment depicted in FIG. 7.

The PS processor 46 performs PS processing for a bit string output from the BCH decoder 45. In particular, the PS processor 46 performs corresponding PS processing for a bit string for which PS processing has been performed by the PS processor 35 in the transmitter 30A. Thus, in this example, the PS processor 46 performs PS processing for an L2 bit string.

PS processing performed by the PS processor 35 and PS processing performed by the PS processor 46 correspond to each other. In particular, as depicted in FIG. 17, the PS processor 46 performs conversion that is the reverse of bit conversion performed by the PS processor 35. In this way, data is recovered in the receiver 40A.

The PS processor 46 is an example of a reverse converter that performs, for data recovered by the BCH decoder 45, reverse conversion for cancelling a conversion performed by the PS processor 35. For example, the PS processor 46 may be implemented by a hardware circuit that converts the values of an input bit string in accordance with a conversion rule determined in advance. However, the PS processor 46 may be implemented by a processor executing a software program.

Figure 21:
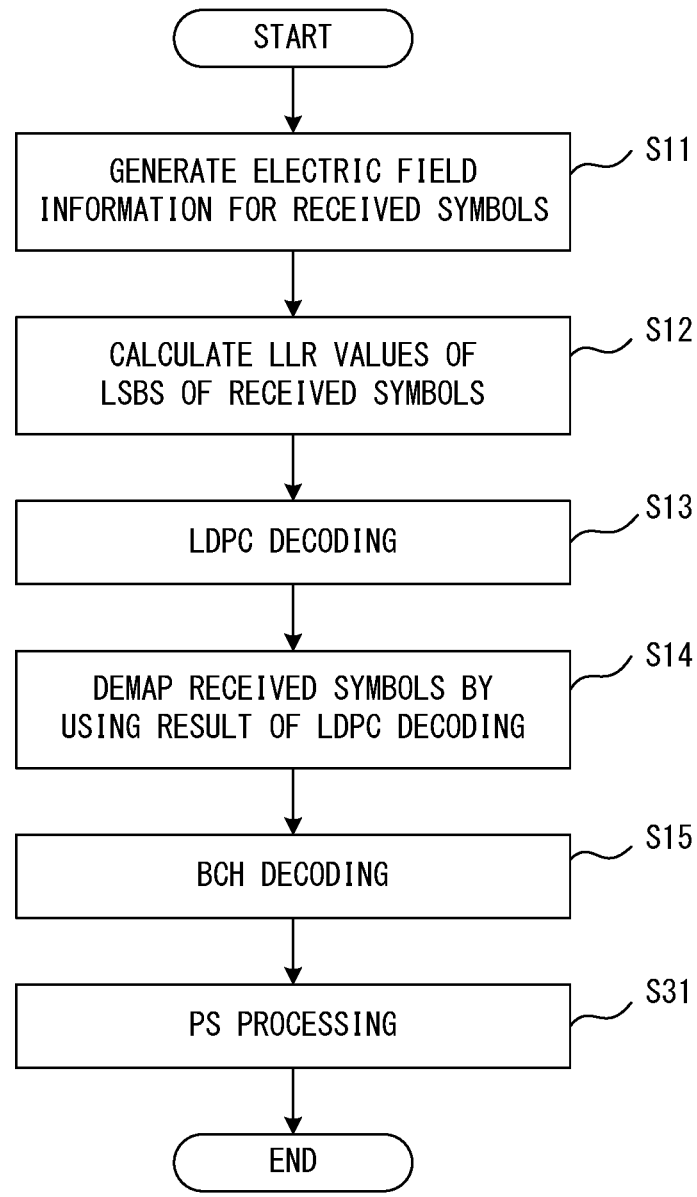
FIG. 21 is a flowchart illustrating an example of operations performed by a receiver in a second embodiment.

FIG. 21 is a flowchart illustrating an example of operations performed by the receiver 40A in the second embodiment. The processes of S11-S15 in the second embodiment are substantially the same as those in the first embodiment. Accordingly, in the second embodiment, the process of S31 is performed in addition to S11-S15 depicted in FIG. 11.

In S31, the PS processor 46 performs PS processing for a bit string output from the BCH decoder 45. Note that the PS processor 46 performs corresponding PS processing for a bit string for which PS processing has been performed in the transmitter 30A (in this example, an L2 bit string).

In the examples described above, PS processing is performed such that the probability of occurrence of "0" is higher than the probability of occurrence of "1." However, the second embodiment is not limited to this configuration. In particular, PS processing may be performed such that the probability of occurrence of "1" is higher than the probability of occurrence of "0." However, in this case, the mapping rule includes "for a bit string for which PS processing is performed, "1" is disposed as much as possible at signal points close to the center of a constellation." For example, this rule may be implemented by allocating "0" to signal points in the first and fourth rows and allocating "1" to signal points in the second and third rows in the mapping rule for level L2 depicted in FIG. 18B.

In the examples described above, PS processing is performed for an L2 bit string. However, the second embodiment is not limited to this configuration, and PS processing may be performed for another bit string. However, PS processing is performed for a bit string in which a parity (an LDPC parity or a BCH parity) is not stored. Thus, the transmitter 30A and the receiver 40A may perform PS processing for an L1 bit string or an L2 bit string.

In the examples described above, PS processing is performed for one bit string in the four bit strings forming a transmission frame. However, the second embodiment is not limited to this configuration, and PS processing may be performed for two or more bit strings in the four bit strings forming a transmission frame. In this example, an LDPC parity is stored in an L0 bit string, and a BCH parity is stored in an L3 bit string, so PS processing may be performed for an L1 bit string and an L2 bit string.

Figure 22A:
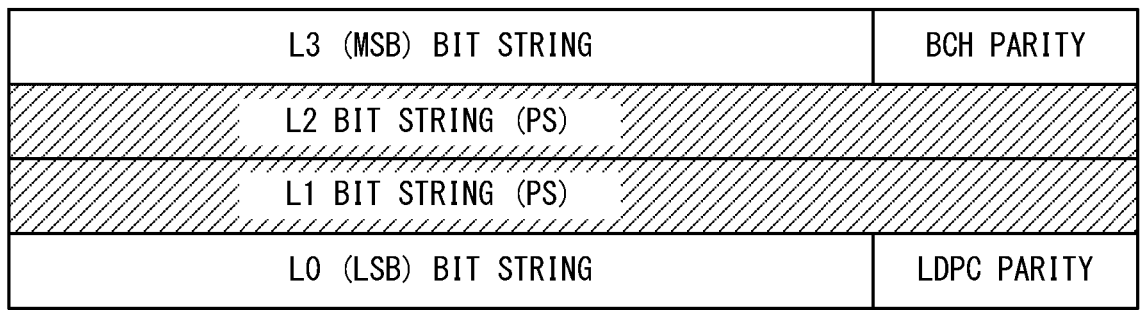
FIGS. 22A-22C illustrate another example of coding in accordance with a second embodiment of the invention.
Figure 22B:
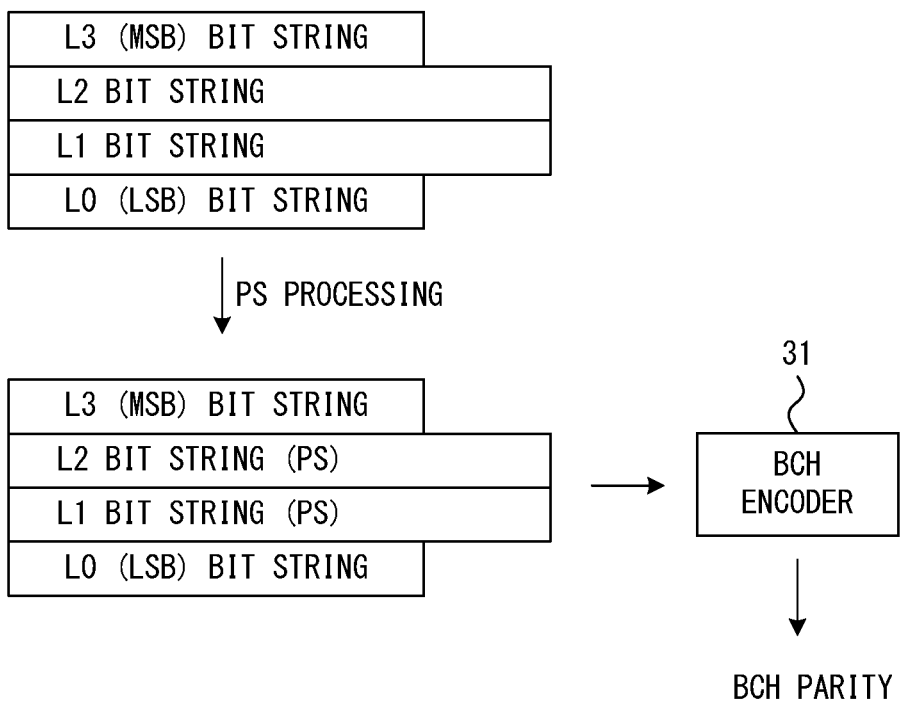
Figure 22C:
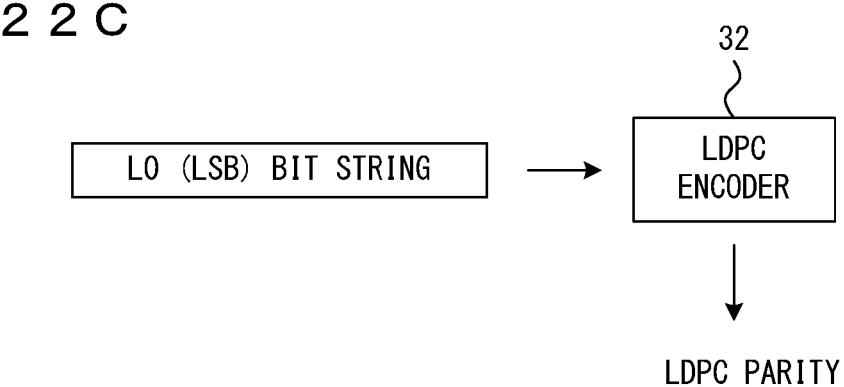

FIGS. 22A-22C illustrate another example of coding in accordance with the second embodiment of the invention. In this example, PS processing is performed for each of an L1 bit string and an L2 bit string, as depicted in FIG. 22B. The BCH encoder 31 generates a BCH parity by performing BCH coding for data to be stored in a level L0 region, data to be stored in a level L1 region after PS processing, data to be stored in a level L2 region after PS processing, and data to be stored in a level L3 region. As depicted in FIG. 22C, the LDPC encoder 32 generates an LDPC parity by performing LDPC coding for the data to be stored in the level L0 region. Then, the LDPC parity and the BCH parity are respectively stored in the L0 bit string and the L3 bit string so as to generate the transmission frame depicted in FIG. 22A.

Figure 23:
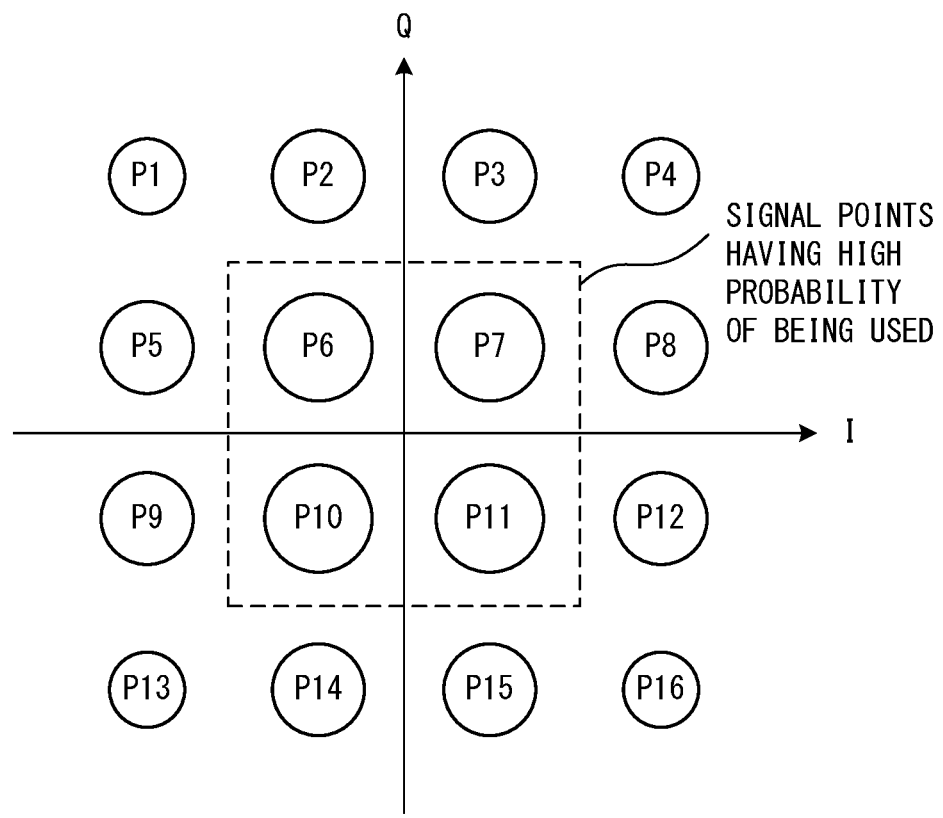
FIG. 23 illustrates an example of the probabilities of use of 16QAM signal points corresponding to a case depicted in FIGS. 22A-22C.

The modulator 34 maps each symbol of the transmission frame depicted in FIG. 22A to a corresponding signal point in accordance with the mapping rule depicted in FIGS. 18A and 18B. In this case, PS processing is performed for each of the L1 bit string and the L2 bit string such that the probability of occurrence of "0" is higher than the probability of occurrence of "1." In this regard, a transmission symbol having "0" in L1 bit is mapped to any signal point among the signal points P2, P3, P6, P7, P10, P11, P14, and P15. A transmission symbol having "0" in L2 bit is mapped to any signal point among the signal points P5-P12. Thus, when PS processing is performed for each of the L1 bit string and the L2 bit string such that the probability of occurrence of "0" is higher than the probability of occurrence of "1," the probabilities of use of the signal points P6, P7, P10, and P11 are high, and the probabilities of use of the signal points P1, P4, P13, and P16 are low, as indicated in FIG. 23. As a result, the average transmission power of the transmitter 30A is further reduced in comparison with the case depicted in FIGS. 16A-16C. In other words, on the assumption that data is transmitted with equal average transmission power in the case depicted in FIGS. 16A-16C and the case depicted in FIGS. 22A-22C, the signal-to-noise ratio is further improved in the case depicted in FIGS. 22A-22C.

Assume, for example, that the signal-to-noise ratio is enhanced by 1.0 dB by performing PS processing for all of the four bit strings corresponding to 16QAM, and that power consumption increases by 0.2 watts when PS processing is performed for one bit string. Under this condition, in the case depicted in FIGS. 16A-16C in which PS processing is performed for one bit string, the signal-to-noise ratio is considered to be enhanced by 0.5 dB in comparison with a case in which PS processing is not performed.

Power consumption increases by 0.4 watts in the case depicted in FIGS. 22A-22C in which PS processing is performed for two bit strings. In this case, a symbol mapping loss of 0.3 dB may occur in comparison with a case in which PS processing is performed for all bit strings. That is, the signal-to-noise ratio is considered to be enhanced by 0.7 dB in comparison with a case in which PS processing is not performed.

Variation of Second Embodiment

In the examples depicted in FIGS. 16A-23, data is transmitted with 16QAM. However, the present invention is not limited to this scheme. In particular, the second embodiment of the invention can be applied to any quadrature amplitude modulation. Specifically, the second embodiment of the invention can be applied to quadrature amplitude modulation in which N (N is an integer larger than or equal to 4) bits are allocated to each symbol.

Figure 24:
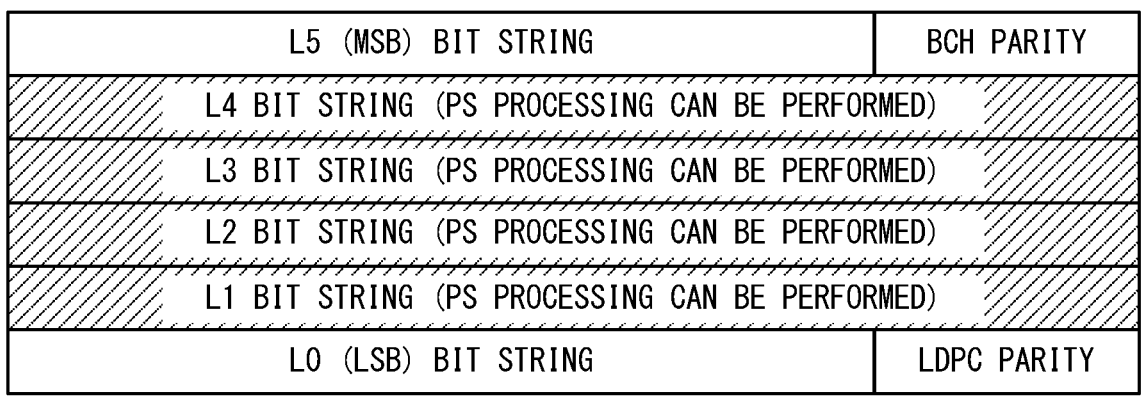
FIG. 24 illustrates an example of coding for 64QAM.

FIG. 24 illustrates an example of coding for 64QAM. In 64QAM, six bits are allocated to each symbol. Thus, a transmission frame is formed from L0-L5 bit strings. When the second embodiment is applied to the 64QAM communication system, PS processing can be performed for four or less bit strings in the six bit strings. In this example, an LDPC parity is stored in an L0 bit string, and a BCH parity is stored in an L5 bit string, so PS processing can be performed for four or less bit strings among the L1-L4 bit strings.

FIGS. 25-27 illustrate examples of a mapping rule for 64QAM in the second embodiment. In this example, the PS processor 35 performs PS processing for a selected bit string such that the probability of occurrence of "0" is higher than the probability of occurrence of "1."

FIGS. 28-31 illustrate examples of the probabilities of use of 64QAM signal points. The size of each circle indicates a probability with which a signal point is used. In particular, a signal point having a high probability of being used is represented by a large circle, and a signal point having a low probability of being used is represented by a small circle.

When PS processing is performed for one bit string, the modulator 34 uses the mapping rule depicted in FIG. 25. In this example, the PS processor 35 performs PS processing for the L3 bit string. Thus, as depicted in FIG. 28, the probabilities of use of the signal points in the third to sixth columns increase.

Figure 29:
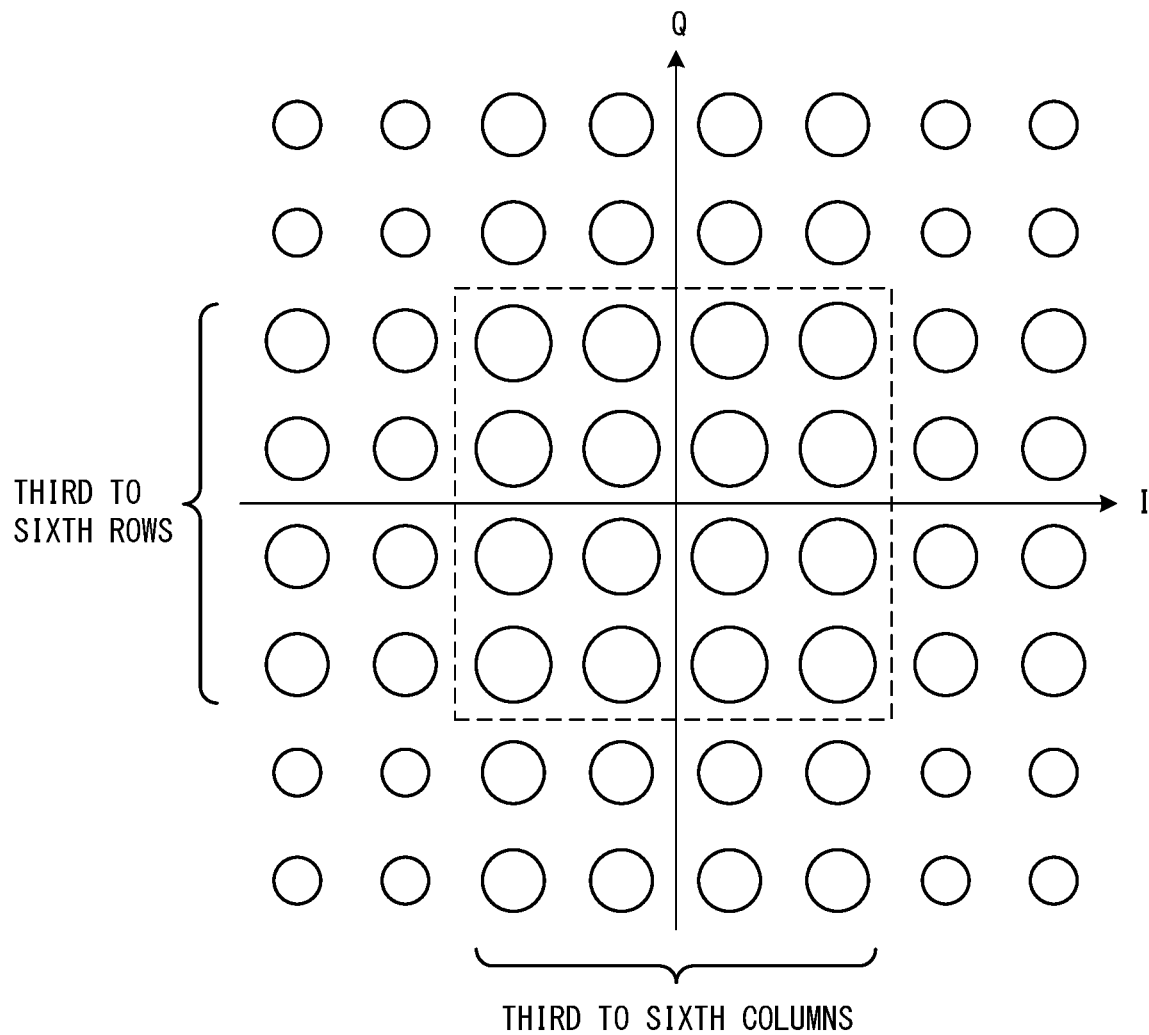
FIG. 29 illustrates the probabilities of use of 64QAM signal points that are attained when PS processing is performed for two bit strings.

When PS processing is performed for two bit strings, the modulator 34 also uses the mapping rule depicted in FIG. 25. In this example, the PS processor 35 performs PS processing for each of the L3-L4 bit strings. Thus, as depicted in FIG. 29, the probabilities of use of the signal points in the third to sixth columns increase, and the probabilities of use of the signal points in the third to sixth rows increase. Accordingly, the probabilities of use of the signal points in the region surrounded by a dashed line become particularly high.

Figure 30:
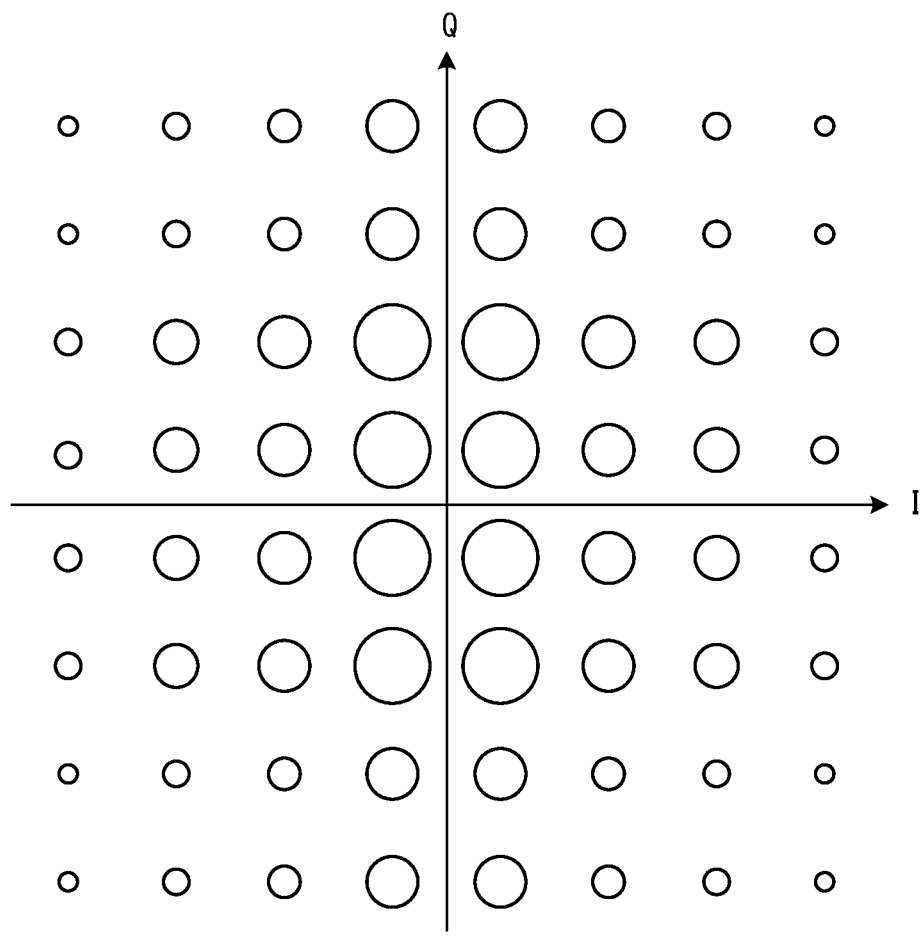
FIG. 30 illustrates the probabilities of use of 64QAM signal points that are attained when PS processing is performed for three bit strings.
Figure 31:
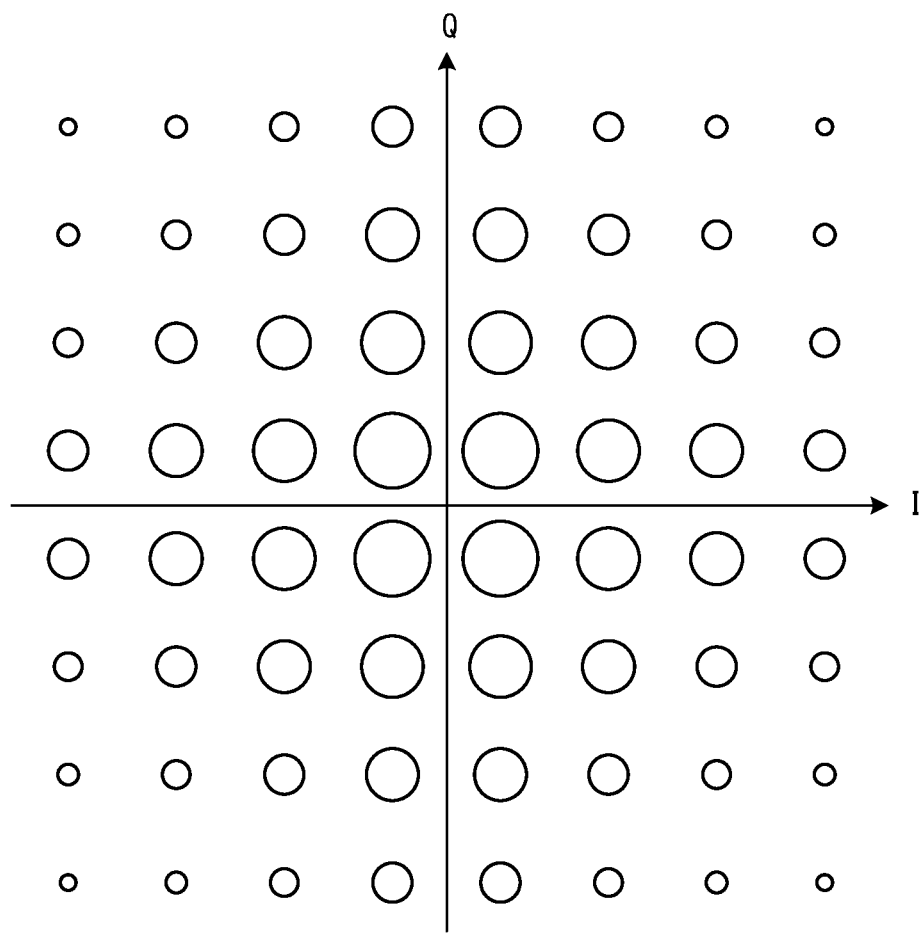
FIG. 31 illustrates the probabilities of use of 64QAM signal points that are attained when PS processing is performed for four bit strings.

When PS processing is performed for three bit strings, the modulator 34 uses the mapping rule depicted in FIG. 26. In this example, the PS processor 35 performs PS processing for each of the L2-L4 bit strings. Thus, the probabilities of use of signal points depicted in FIG. 30 are obtained. When PS processing is performed for four bit strings, the modulator 34 uses the mapping rule depicted in FIG. 27. In this example, the PS processor 35 performs PS processing for each of the L1-L4 bit strings. Thus, the probabilities of use of signal points depicted in FIG. 31 are obtained.

As described above, an increase in the number of bit strings for which PS processing is performed will cause the probabilities of use of signal points located close to the center of the constellation to be enhanced. Thus, increasing the number of bit strings for which PS processing is performed reduces the average transmission power of the transmitter 30A. In other words, on the assumption that data is transmitted with equal average transmission power in the first and second embodiments, the second embodiment will attain an improved signal-to-noise ratio because the transmission power of each signal point can be high. However, since performing PS processing increases power consumption, the total power consumption and the signal-to-noise ratio may have a relationship of trade-off.

Assume, for example, that power consumption increases by 0.2 watts when PS processing is performed for one bit string. In this case, the following relationship is estimated to be attained. In particular, in a case in which PS processing is performed for one bit string, power consumption increases by 0.2 watts, while the signal-to-noise ratio is enhanced by 0.3 dB, in comparison with a case in which PS processing is not performed. In a case in which PS processing is performed for two bit strings, power consumption increases by 0.4 watts, while the signal-to-noise ratio is enhanced by 0.6 dB. In a case in which PS processing is performed for three bit strings, power consumption increases by 0.6 watts, while the signal-to-noise ratio is enhanced by 0.7 dB. In a case in which PS processing is performed for four bit strings, power consumption increases by 0.8 watts, while the signal-to-noise ratio is enhanced by 0.8 dB.

When PS processing is performed for a plurality of levels, the mark ratios of the levels may be or not may be equal. For example, PS processing may be performed such that for one level, the probability of occurrence of zero is 70 percent (in this case, the probability of occurrence of 1 is 30 percent), and PS processing may be performed such that for another level, the probability of occurrence of zero is 80 percent (in this case, the probability of occurrence of 1 is 20 percent).

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A communication system in which data is transmitted from a first communication device to a second communication device with quadrature amplitude modulation allocating a plurality of bits to each symbol, wherein
    the first communication device includes:
        a modulator configured to generate a modulated signal by mapping each symbol in a data frame that includes the data, a first code, and a second code to a signal point among two-dimensionally arranged signal points specific to the quadrature amplitude modulation;
        a first encoder configured to encode the data by using a first coding scheme so as to generate the first code; and
        a second encoder configured to encode, by using a second coding scheme different from the first coding scheme, a bit string formed from a specified bit in a plurality of bits allocated to each symbol in the data frame so as to generate the second code,
    the second communication device includes a decoder configured to perform, for the modulated signal, a decoding process based on the first coding scheme and a decoding process based on the second coding scheme so as to recover the data, and
    the modulator performs mapping such that each pair of adjacent signal points are different from each other in terms of a value of the specified bit in the plurality of bits.

2. The communication system according to claim 1, wherein
    the first communication device further includes a converter configured to convert values of the data such that a transmission symbol is mapped with a higher probability to a signal point located closer to a center of a constellation indicating the quadrature amplitude modulation, and
    the second communication device further includes a reverse converter configured to perform, for data recovered by the decoder, reverse conversion for cancelling a conversion performed by the converter.

3. A communication device for generating a modulated signal with quadrature amplitude modulation allocating a plurality of bits to each symbol, the communication device comprising:
    a modulator configured to generate a modulated signal by mapping each symbol in a data frame that includes transmission data, a first code, and a second code to a signal point among two-dimensionally arranged signal points specific to the quadrature amplitude modulation;
    a first encoder configured to encode the transmission data by using a first coding scheme so as to generate the first code; and
    a second encoder configured to encode, by using a second coding scheme different from the first coding scheme, a bit string formed from a specified bit in a plurality of bits allocated to each symbol in the data frame so as to generate the second code, wherein
    the modulator performs mapping such that each pair of adjacent signal points are different from each other in terms of a value of the specified bit in the plurality of bits.

4. The communication device according to claim 3, further comprising:
    a frame generator configured to generate the data frame that includes the transmission data, the first code generated by the first encoder, and the second code generated by the second encoder, wherein
    the frame generator disposes the second code at the specified bit in the data frame.

5. The communication device according to claim 4, wherein
    the frame generator disposes the first code at a bit in the data frame other than the specified bit.

6. The communication device according to claim 3, wherein
    the specified bit is a least significant bit of the plurality of bits.

7. The communication device according to claim 3, wherein
    the quadrature amplitude modulation is 16QAM in which four bits are allocated to each symbol or 64QAM in which six bits are allocated to each symbol.

8. The communication device according to claim 3, further comprising:
    a converter configured to convert values of the transmission data such that a transmission symbol is mapped with a higher probability to a signal point located closer to a center of a constellation indicating the quadrature amplitude modulation.

9. The communication device according to claim 8, wherein
    the coveter converts values of transmission data stored in a first bit string in a plurality of bit strings forming the data frame, such that a number of first logical values is larger than a number of second logical values in the transmission data, and
    the converter maps a transmission symbol in which a value of bit belonging to the first bit string is the first logical value to a signal point in a first region on the constellation, and maps a transmission symbol in which a value of bit belonging to the first bit string is the second logical value to a signal point in a second region positioned farther from the center of the constellation than the first region is.

10. A communication device for receiving data transmitted from a transmitter with quadrature amplitude modulation allocating a plurality of bits to each symbol, wherein the transmitter includes
- a modulator configured to generate a modulated signal by mapping each symbol in a data frame that includes the data, a first code, and a second code to a signal point among two-dimensionally arranged signal points specific to the quadrature amplitude modulation,
- a first encoder configured to encode the data by using a first coding scheme so as to generate the first code, and
- a second encoder configured to encode, by using a second coding scheme different from the first coding scheme, a bit string formed from a specified bit in a plurality of bits allocated to each symbol in the data frame so as to generate the second code, the modulator performs mapping such that each pair of adjacent signal points are different from each other in terms of a value of the specified bit in the plurality of bits, and the communication device includes
- a second decoder configured to decode, by using the second coding scheme, a bit string formed from the specified bit in the plurality of bits allocated to each symbol in the data frame,
- a decision circuit configured to decide each symbol in the data frame by using a decoding result provided by the second decoder so as to recover the data, the first code, and the second code, and
- a first decoder configured to decode the recovered data based on the recovered first code by using the first coding scheme.

11. A communication method for transmitting data with quadrature amplitude modulation allocating a plurality of bits to each symbol, the communication method comprising:
- encoding transmission data by using a first coding scheme so as to generate a first code;
- encoding, by using a second coding scheme different from the first coding scheme, a bit string formed from a specified bit in a plurality of bits allocated to each symbol in a data frame so as to generate a second code;
- generating the data frame from the transmission data, the first code, and the second code;
- generating a modulated signal by mapping each symbol in the data frame to a signal point among two-dimensionally arranged signal points specific to the quadrature amplitude modulation, in accordance with a mapping rule in which each pair of adjacent signal points are different from each other in terms of a value of the specified bit in the plurality of bits; and
- transmitting the modulated signal.

12. The communication method according to claim 11, further comprising:
- converting values of the transmission data such that a transmission symbol is mapped with a higher probability to a signal point located closer to a center of a constellation indicating the quadrature amplitude modulation.

13. The communication method according to claim 12, wherein
- values of transmission data stored in a first bit string in a plurality of bit strings forming the data frame are converted such that a number of first logical values is larger than a number of second logical values in the transmission data,
- a transmission symbol in which a value of bit belonging to the first bit string is the first logical value is mapped to a signal point in a first region on the constellation, and
- a transmission symbol in which a value of bit belonging to the first bit string is the second logical value is mapped to a signal point in a second region positioned farther from the center of the constellation than the first region is.

* * * * *